United States Patent
Lohmar et al.

(10) Patent No.: US 9,456,315 B2
(45) Date of Patent: Sep. 27, 2016

(54) MULTICAST GROUP REUSE IN CELLULAR NETWORK MULTICASE TRANSPORT

(71) Applicant: Telefonaktiebolaget L M Ericsson (publ), Stockholm (SE)

(72) Inventors: Thorsten Lohmar, Aachen (DE); Igor Kushnirov, Montreal (CA); Hans Bertil Rönneke, Kungsbacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 102 days.

(21) Appl. No.: 14/408,163

(22) PCT Filed: Apr. 30, 2013

(86) PCT No.: PCT/EP2013/059005
§ 371 (c)(1),
(2) Date: Dec. 15, 2014

(87) PCT Pub. No.: WO2014/177194
PCT Pub. Date: Nov. 6, 2014

(65) Prior Publication Data
US 2015/0195684 A1  Jul. 9, 2015

(51) Int. Cl.
*H04W 4/06* (2009.01)
*H04W 76/00* (2009.01)
(Continued)

(52) U.S. Cl.
CPC .............. *H04W 4/06* (2013.01); *H04W 76/002* (2013.01); *H04W 76/021* (2013.01); *H04L 12/189* (2013.01)

(58) Field of Classification Search
CPC .. H04L 12/189; H04W 4/06; H04W 76/002; H04W 76/021
USPC ........................................................ 370/312
See application file for complete search history.

(56) References Cited

U.S. PATENT DOCUMENTS

| 8,447,284 B1 * | 5/2013 | Lee ......................... H04W 4/06 455/3.01 |
| 2005/0091315 A1 * | 4/2005 | Hurtta ................. H04L 12/1868 709/204 |

(Continued)

FOREIGN PATENT DOCUMENTS

| EP | 2 034 660 A1 | 3/2009 | |
| EP | 2034660 A1 * | 3/2009 | ............. H04L 45/18 |

OTHER PUBLICATIONS

3GPP: Technical Specification Group Core Network and Terminals; General Packet Radio system (gprs) Tunnelling Protocol User Plane (gtpv1-u); Release 11; published Mar. 12, 2013; see Chapter 1 "Scope" Chapter 4.2.6 "MBMS IP Multicast Distribution of the User Plane Data".*
(Continued)

*Primary Examiner* — Chi H Pham
*Assistant Examiner* — Robert Lopata
(74) *Attorney, Agent, or Firm* — Rothwell, Figg, Ernst & Manbeck, P.C.

(57) ABSTRACT

For transmission of multicast data in a cellular network, a gateway (200) allocates a set of multicast sessions (111, 112) to a single Internet Protocol Multicast group (110). For each of the multicast sessions (111, 112), the gateway indicates an Internet Protocol Multicast address of the Internet Protocol Multicast group to one or more radio access network nodes (100) of the cellular network. For each of the multicast sessions (111, 112), the gateway (200) indicates a different identifier to the radio access network nodes (100), e.g., in the form of a Tunnel Endpoint Identifier. The gateway (200) sends multicast data of the multicast sessions (111, 112) in one or more Internet Protocol Multicast data packets addressed to the Internet Protocol Multicast address of the Internet Protocol Multicast group. The multicast data of each of the multicast sessions (111, 112) include the respective identifier to allow identification of the multicast session (111, 112) at the radio access network node (100).

32 Claims, 12 Drawing Sheets

(51) Int. Cl.
*H04W 76/02* (2009.01)
*H04L 12/18* (2006.01)

(56) References Cited

U.S. PATENT DOCUMENTS

| | | | | |
|---|---|---|---|---|
| 2005/0157742 | A1* | 7/2005 | Chen | H04L 12/1886 370/432 |
| 2006/0109795 | A1* | 5/2006 | Kamata | H04M 15/00 370/252 |
| 2008/0293399 | A1* | 11/2008 | Xu | H04W 76/022 455/422.1 |
| 2010/0027541 | A1 | 2/2010 | Eriksson et al. | |
| 2010/0150049 | A1* | 6/2010 | Kim | H04W 76/022 370/312 |
| 2010/0153807 | A1* | 6/2010 | Kakani | H04L 12/1863 714/749 |
| 2010/0272103 | A1* | 10/2010 | Ananthanarayanan | H04L 12/189 370/390 |
| 2012/0176953 | A1* | 7/2012 | Chao | H04L 65/1069 370/312 |
| 2012/0307707 | A1* | 12/2012 | Wang | H04W 72/005 370/312 |
| 2013/0114497 | A1* | 5/2013 | Zhang | H04W 72/005 370/312 |
| 2013/0156033 | A1* | 6/2013 | Balay | H04L 12/18 370/390 |
| 2013/0188547 | A1* | 7/2013 | Moriwaki | H04W 72/005 370/312 |
| 2013/0279394 | A1* | 10/2013 | Aramoto | H04W 76/002 370/312 |
| 2013/0279395 | A1* | 10/2013 | Aramoto | H04W 76/062 370/312 |
| 2013/0294320 | A1* | 11/2013 | Jactat | H04L 12/189 370/390 |
| 2013/0315125 | A1* | 11/2013 | Ravishankar | H04W 72/005 370/312 |
| 2014/0161020 | A1* | 6/2014 | Jung | H04W 48/20 370/312 |
| 2014/0177512 | A1* | 6/2014 | Howard | H04L 12/1881 370/312 |
| 2014/0194100 | A1* | 7/2014 | Anchan | H04W 76/005 455/416 |
| 2014/0198707 | A1* | 7/2014 | Wang | H04W 72/005 370/312 |
| 2014/0241229 | A1* | 8/2014 | Bertorelle | H04W 4/06 370/312 |
| 2014/0313974 | A1* | 10/2014 | Chandramouli | H04W 4/06 370/328 |
| 2014/0355508 | A1* | 12/2014 | Anchan | H04W 4/10 370/312 |
| 2014/0376441 | A1* | 12/2014 | Lohmar | H04W 4/06 370/312 |
| 2015/0156658 | A1* | 6/2015 | Zhang | H04W 4/06 370/252 |
| 2015/0189336 | A1* | 7/2015 | Wang | H04N 21/2225 725/62 |
| 2015/0223030 | A1* | 8/2015 | Gu | H04W 72/005 370/312 |
| 2015/0229677 | A1* | 8/2015 | Gu | H04L 65/103 709/219 |
| 2015/0312519 | A1* | 10/2015 | Cicic | H04L 12/1822 348/14.08 |
| 2016/0021516 | A1* | 1/2016 | Han | H04W 4/06 370/312 |
| 2016/0050544 | A1* | 2/2016 | Chandramouli | H04L 12/1845 370/312 |
| 2016/0072665 | A1* | 3/2016 | Xia | H04L 41/0659 370/225 |

OTHER PUBLICATIONS

3GPP: Technical Specification Group Services and System Aspects; Multimedia Broadcast/Multicast Service (MBMS); Architecture and functional description (Release 11); published Mar. 9, 2012; see Chapter 1 "Scope" Chapter 4.2 "Reference Architecture Model" Chapter 8.3.2 "MBMS Session Start Procedure for E-UTRAN and UTRAN for EPS".*

3GPP TS 36.444 V11.4.0 (Dec. 2012), 3rd Generation Partnership Project; Technical Specification Group Radio Access Network; Evolved Universal Terrestrial Radio Access Network (E-UTRAN); M3 Application Protocol (M3AP) (Release 11).

* cited by examiner

MULTICAST GROUP REUSE IN CELLULAR NETWORK MULTICASE TRANSPORT

CROSS-REFERENCE TO RELATED APPLICATION

This application is a 35 U.S.C. §371 National Phase Entry Application from PCT/EP2013/059005, filed Apr. 30, 2013, and designating the United States.

TECHNICAL FIELD

The present invention relates to methods for transmitting multicast traffic in a cellular network and to corresponding devices.

BACKGROUND

In cellular networks, it is known to provide a user equipment (UE) with packet data connectivity so as to allow Internet Protocol based data transmission to or from the UE. This may for example be achieved by using the Evolved Packet System (EPS) architecture as specified by the $3^{rd}$ Generation Partnership Project (3GPP). To support efficient distribution of multimedia content, such packet data connectivity may also be supplemented by support for broadcast and multicast transmission modes, as for example realized by the Multimedia Broadcast/Multicast Service (MBMS) architecture specified in 3GPP TS 23.246 V11.1.0.

In the MBMS enhanced EPS architecture, IP Multicast transmission, e.g., as specified by IETF RFC 2236, IETF RFC 3376, or IETF RFC 3810, may be used not only on the user level, by allocating an IP Multicast address to an IP Multicast group including multiple UEs, but also for transport purposes within the network. Specifically, on the M1 interface between an MBMS gateway (MBMS GW) and a Radio Access Network (RAN), a transport IP Multicast group may be defined to include multiple nodes of the RAN, and a transport IP Multicast address allocated to the transport IP Multicast group may be used to distribute data from a MBMS GW to the RAN nodes. Depending on the utilized radio access technology, such RAN nodes may be base stations of the LTE (Long Term Evolution) radio access technology, also referred to as eNB, or base station controllers of the UMTS (Universal Mobile Telecommunications System) radio access technology, also referred to as Radio Network Controller (RNC).

According to 3GPP TS 23.246, the MBMS GW allocates the IP Multicast address per MBMS bearer service. This means that a new IP Multicast address is needed for each MBMS session transmitted by the RAN nodes. Specifically in view of the fact that the number of MBMS sessions may be quite large, e.g., in the range of thousand, this may require significant resources in the involved nodes, such as in eNBs, which may need to be part of multiple IP Multicast groups and be engaged in corresponding protocol activities. Further, a large number of used IP Multicast addresses may also affect routers or switches which are used to forward the data of the IP multicast transmission in the network. For example, such routers may need to maintain and communicate information concerning the IP Multicast groups and IP Multicast routes, and the amount of information to be handled may increase considerably with the number of used IP Multicast groups.

Accordingly, there is a need for techniques which allow for efficiently implementing multicast transmission in a cellular network.

SUMMARY

According to an embodiment of the invention, a method for controlling transmission of multicast data in a cellular network is provided. According to the method, a gateway allocates a set of multicast sessions to a single IP Multicast group. For each of the multicast sessions, the gateway indicates an IP Multicast address of the Internet Protocol Multicast group to at least one RAN node of the cellular network. For each of the multicast sessions, the gateway indicates a different identifier to the at least one RAN node. Further, the gateway sends multicast data of the multicast sessions in one or more IP Multicast data packets addressed to the IP Multicast address of the IP Multicast group. To allow identification of the multicast session, the multicast data of each of the multicast sessions comprise the identifier of the multicast session.

According to a further embodiment of the invention, a method for controlling transmission of multicast data in a cellular network is provided. According to the method, a RAN node of the cellular network receives, from a gateway, an indication of an IP Multicast address of an Internet Protocol Multicast group to which a multicast session and at least one further multicast session are allocated. The RAN node also receives an identifier of the multicast session from the gateway. Further, the RAN node receives multicast data of the multicast session and of the at least one further multicast session in one or more IP Multicast data packets addressed to the IP Multicast address of the IP Multicast group. The multicast data of the multicast session comprise the indicated identifier. On the basis of the identifier, the RAN node distinguishes the multicast data of the multicast session from the multicast data of the at least one further multicast session. Further, the RAN node transmits the multicast data of the multicast session to a corresponding multicast radio channel.

According to a further embodiment of the invention, a gateway for a cellular network is provided. The gateway comprises at least one interface and at least one processor. The at least one processor is configured to allocate a set of multicast sessions to a single IP Multicast group. Further, the at least one processor is configured to indicate, via the at least one interface, an IP Multicast address of the IP Multicast group to at least one RAN node of the cellular network. Further, the at least one processor is configured to indicate, via the at least one interface, a different identifier for each of the multicast sessions to the at least one RAN node. Further, the at least one processor is configured to send, via the at least one interface, multicast data of the multicast sessions in one or more IP Multicast data packets addressed to the IP Multicast address of the IP Multicast group. To allow identification of the multicast session, the multicast data of each of the multicast sessions comprise the identifier of the multicast session.

According to a further embodiment of the invention, a RAN node for a cellular network is provided. The RAN node comprises at least one interface and at least one processor. The at least one processor is configured to receive, via the at least one interface, an indication of an IP Multicast address of an IP Multicast group to which a multicast session and at least one further multicast session are allocated. Further, the at least one processor is configured to receive, via the at least one interface, an identifier of the multicast session. Further, the at least one processor is configured to receive, via the at least one interface, multicast data of the multicast session and of the at least one further multicast session in one or more IP Multicast data packets addressed to the IP Multicast address of the IP Multicast group. The multicast data of the multicast session comprise the indicated identifier. Further, the at least one processor is configured to distinguish, on the basis of the identifier, the multicast data of the multicast session from the multicast data of the at least one further multicast session. Further, the at least one processor is configured to forward, via the at least one interface, the multicast data of the multicast session to a corresponding multicast radio channel.

According to a further embodiment of the invention, a computer program is provided. The computer program comprises program code to be executed by at least one processor of a gateway of a cellular network. Execution of the program code causes the gateway to allocate a set of multicast sessions to a single IP Multicast group. Further, execution of the program code causes the gateway to indicate an IP Multicast address of the IP Multicast group to at least one RAN node of the cellular network. Further, execution of the program code causes the gateway to indicate a different identifier for each of the multicast sessions to the at least one RAN node. Further, execution of the program code causes the gateway to send multicast data of the multicast sessions in one or more IP Multicast data packets addressed to the IP Multicast address of the IP Multicast group. To allow identification of the multicast session, the multicast data of each of the multicast sessions comprise the identifier of the multicast session.

According to a further embodiment of the invention, a computer program is provided. The computer program comprises program code to be executed by at least one processor of a RAN node of a cellular network. Execution of the program code causes the RAN node to receive an indication of an IP Multicast address of an IP Multicast group to which a multicast session and at least one further multicast session are allocated. Further, execution of the program code caused the RAN node to receive an identifier of the multicast session. Further, execution of the program code caused the RAN node to receive multicast data of the multicast session and of the at least one further multicast session in one or more IP Multicast data packets addressed to the IP Multicast address of the IP Multicast group. The multicast data of the multicast session comprise the indicated identifier. Further, execution of the program code caused the RAN node to distinguish, on the basis of the identifier, the multicast data of the multicast session from the multicast data of the at least one further multicast session. Further, execution of the program code caused the RAN node to forward the multicast data of the multicast session to a corresponding multicast radio channel.

DETAILED DESCRIPTION OF EMBODIMENTS

In the following, concepts according to embodiments of the invention will be explained in more detail by referring to the accompanying drawings. The illustrated concepts relate to transmission of multicast data in a cellular network, in particular to transport of multicast data of multiple multicast sessions to RAN nodes of the cellular network. In the illustrated concepts, it is mostly assumed that the cellular network is based on LTE radio access technology, and the involved nodes are termed accordingly. However, it is to be understood that the concepts could be applied in a corresponding manner also in other types of cellular networks, e.g., implementing additional or other radio access technologies, such as UMTS or GSM (Global System for Mobile Communications) in connection with GPRS (General Packet Radio Service). The term "multicast data" refers to user plane data intended for a plurality of UEs, and transmission of such multicast data may be accomplished using multicast or broadcast transmission modes.

The illustrated concepts involve reusing the same IP Multicast group for transport of multicast data of a plurality of multicast sessions between a gateway and one or more RAN nodes. For allowing such RAN node to identify the multicast data of an individual session, the multicast data are transmitted together with an identifier, which is different for each multicast session of the IP Multicast group. The multicast sessions may specifically be MBMS sessions. That is to say, each multicast session may correspond to an MBMS bearer service between the gateway and a group of UEs, and the multicast data may correspond to MBMS user data. The identifier may be a tunnel endpoint identifier (TEID) of a tunnelling protocol, e.g., a common TEID (C-TEID) according to 3GPP TS 29.281 V11.6.0.

Figure 1:
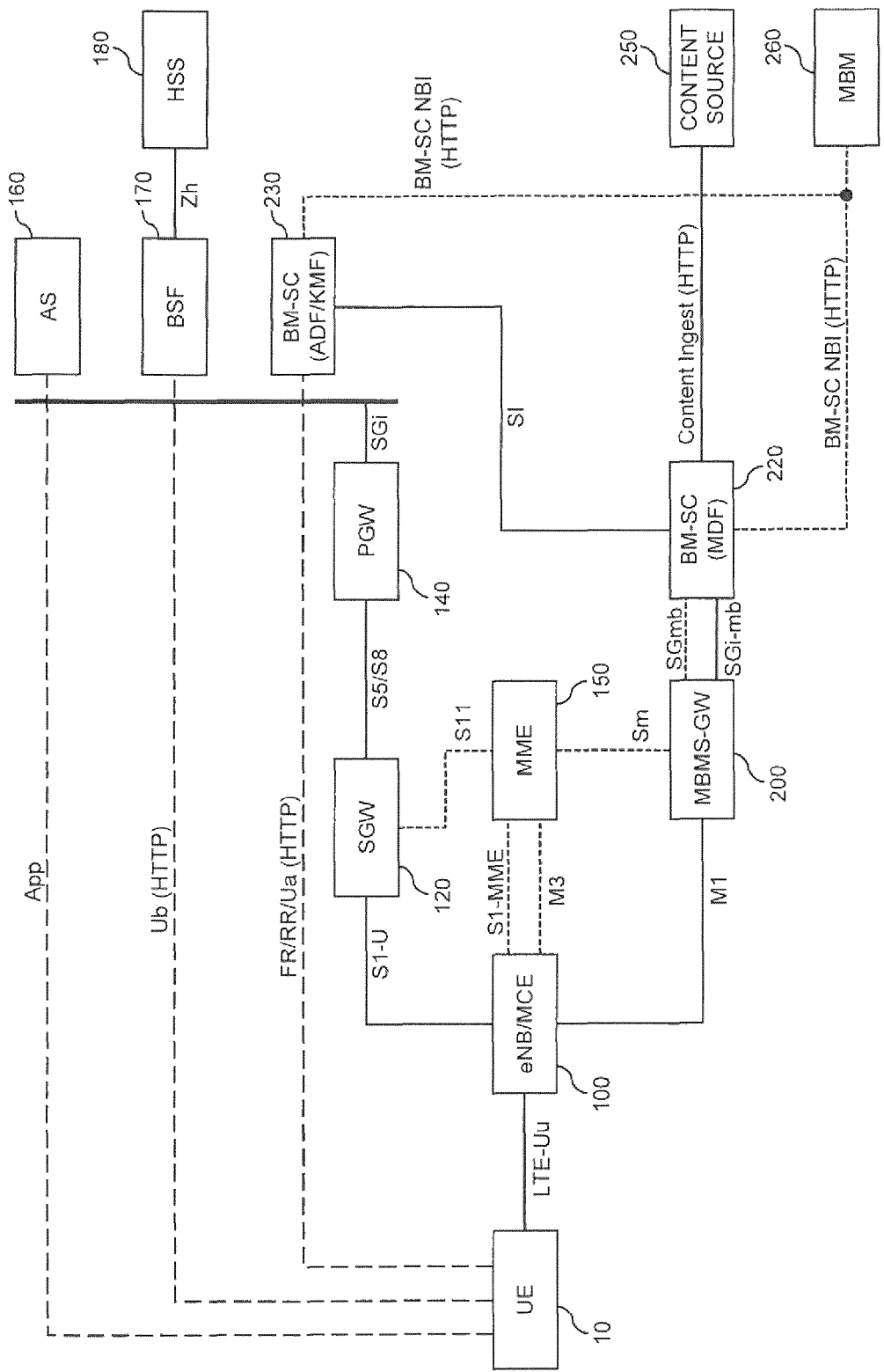
FIG. 1 schematically illustrates an exemplary cellular network environment in which multicast transport according to an embodiment of the invention may be applied.

An exemplary cellular network environment in which the concepts may be implemented is shown in FIG. 1. More specifically, FIG. 1 illustrates an exemplary scenario in which EPS infrastructure of the cellular network is supplemented by MBMS infrastructure. An eNB 100 is illustrated as exemplary RAN node of the cellular network. The EPS infrastructure includes gateway nodes, in particular a Serving Gateway (SGW) 120 and a Packet Data Network Gateway (PGW) 140 Further, a Mobility Management Entity (MME) 150 is provided. The eNB 100 may establish a radio connection to a UE 10. As illustrated, this may be accomplished using the LTE-Uu radio interface. The SGW 120 and the PGW 140 carry user plane packet data of the UE 10, using IP unicast transmission over user plane interfaces referred to as S1-U, S5/S8, and SGi. The MME 150 acts as a control node and for example implements mobility related control functions with respect to the eNB 100 and the SGW 120. Corresponding control signaling is carried by a control plane interface between the MME 150 and the eNB 100, referred to as S1-MME, and by a control plane interface between the MME 150 and the SGW 120, referred to as S11.

The MBMS infrastructure of the illustrated example includes an MBMS-GW 200, a Broadcast Multicast Service Center (BM-SC) 220, 230, and a Mobile Broadcast Manager (MBM) 260. For security reasons, the illustrated BM-SC 220, 230 is split into a node 220 implementing a Media Delivery Function (MDF) and a node 230 implementing an Associated Delivery Function (ADF) and a Key Management Function (KMF). These two nodes 220, 230 communicate via an control plane interface, referred to as SI. The BM-SC (ADF/KMF) 230 may be responsible for handling interactions with the UE 10 and be deployed in a different physical location in the network as the BM-SC (MDF) 220. The BM-SC (MDF) 220 is responsible for delivering user plane media to the MBMS-GW 200. Further, the BM-SC (MDF) 220 may control MBMS sessions, e.g., starting or stopping of an MBMS session. The BM-SC (MDF) 220 communicates via a user plane interface, referred to as SGi-mb, and via a control plane interface, referred to as SG-mb, with the MBMS-GW 200. The BM-SC (MDF) 220 may receive the user plane media via a Content Ingest interface from a content source 250. As illustrated, the Content Ingest interface may be based on the Hypertext Transfer Protocol (HTTP). The ADF may support File Repair (FR) or Reception Reporting (RR) to ensure Quality of Service (QoS) of the transmitted media. The KMF may support Generic Bootstrapping Architecture (GBA) transactions over the Ua interface. The BM-SC (ADF/KMF) 230 may communicate with the UE 10 using the packet data connectivity provided via the PGW 140 and the SGW 120, e.g., using HTTP. A control plane interface between the BM-SC 220, 230 and the MBM 260 is referred to as BM-SC Northbound Interface (NBI) and may be based on HTTP as well. The BM-SC 220, 230 may also provide a number of service layer functions, such as Service Announcement.

As further illustrated, the eNB 100 may be provided with a Multi-Cell/Multicast Coordination Entity (MCE). The MCE may be responsible for handling admission control for MBMS sessions and allocation of radio resources commonly used by eNBs in an MBMS Single Frequency Network (MBSFN) transmission. The eNB 100 also supports broadcasting of MBMS user data and MBMS related control signaling on the LTE-Uu interface.

The MBMS-GW 200 is responsible for distributing the MBMS user data to the eNB 100 and other eNBs transmitting the MBMS user data. This is accomplished via a user plane interface between the MBMS-GW 200 and the eNB 100, referred to as M1. Efficient distribution of the MBMS user data to a plurality of eNBs may be achieved by using IP Multicast on the M1 interface. Unless explained otherwise, the M1 interface may generally be implemented as specified in 3GPP TS 36.445 V11.0.0. In addition, the MBMS-GW 200 may be responsible for controlling MBMS sessions, e.g., starting or stopping of an MBMS session, which is accomplished using a control plane interface from the MBMS-GW 200 to the MME 150, referred to as Sm, and via a control plane interface from the MME 150 to the eNB 100, referred to as M3.

The M1 interface is a user plane interface, which is based on a tunneling protocol, in particular GTPv1-U as specified in 3GPP TS 29.281. For each MBMS session, the MBMS-GW 200 assigns a different common TEID (C-TEID). Further, the MBMS-GW 200 selects an IP Multicast group to be used for the MBMS session. The C-TEID and the IP Multicast group are valid for all the receiving eNBs. The concepts as illustrated herein involve that the same IP Multicast group may be reused for multiple MBMS sessions.

The MBMS-GW 200 distributes the IP Multicast address of the selected IP Multicast group, the M1 source IP address of the MBMS-GW 200, and the C-TEID as part of the control plane signaling to the eNBs, e.g., to the illustrated eNB 100. This control plane signaling is conveyed via the Sm interface from the MBMS-GW 200 to the MME 150, and via the M3 interface from the MME 150 to the eNBs, e.g., to the illustrated eNB 100.

The MME 150 is responsible for session control of MBMS bearers established between the eNB 100 and the UE 10. This may for example include delivery of session start or session stop indications. For this purpose, the MME 150 transmits session control messages via the M3 interface to the eNBs involved in transmission of an MBMS session.

In addition, further nodes may be involved in the handling of an MBMS session. As illustrated, such nodes may include an Application Server (AS) 160 for implementing top-level user control functions. Such AS 160 may communicate with the UE 10 using application layer signaling over the SGi interface and the PGW 140. Further, such nodes may include a GBA Bootstrapping Server Function (BSF) 170 for user authentication purposes. Such BSF 170 may communicate with the UE 10 using the Ub protocol and HTTP over the SGi interface and the PGW 140. In accordance with known GBA functionalities, the BSF 170 may communicate with a Home Subscriber Server (HSS) 180 of the cellular network over the Zh interface to retrieve subscriber data.

Figure 2:
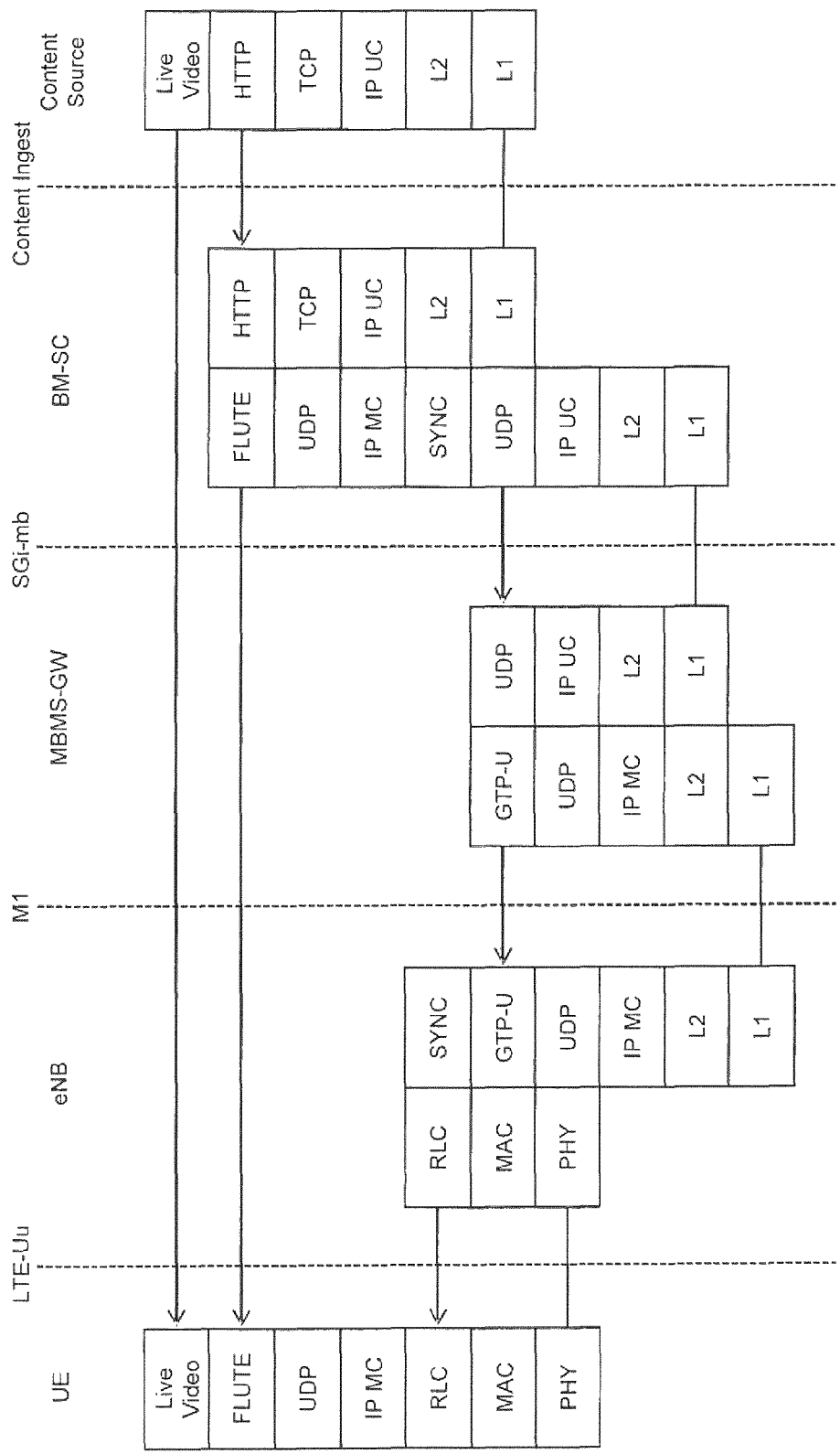
FIG. 2 shows an example of a user plane protocol stack of a multicast session which may be transmitted using multicast transport according to an embodiment of the invention.

FIG. 2 shows an example of a user plane protocol stack of an MBMS session, in particular of a live video service using for example HTTP Live Streaming (HLS) or Dynamic Adaptive Streaming over HTTP (DASH). The user plane protocol stack of FIG. 2 may for example be applied if the content source corresponds to a live encoder which uploads media segments in the form of files over the Content Ingest interface to the BM-SC. In the example of FIG. 2, the Content Ingest interface is assumed to be implemented on the basis of HTTP, e.g., using Web-based Distributed Authoring and Versioning (WebDAV). The BM-SC transforms the uploaded file into the FLUTE transmission protocol according to IETF RFC 3926, and may optionally add Forward Error Correction (FEC) redundancy on the application layer. The BM-SC further adds MBMS synchronization protocol (SYNC) information and sends the flow using an UDP tunnel over the SGi-mb interface to the MBMS-GW. The MBMS-GW forwards the UDP packet payload, using GTP-U over UDP and IP Multicast (IP MC), to all listening eNBs. Lower protocol layers of the Content Ingest interface include the Transmission Control Protocol (TCP), IP Unicast (IP UC), and L2/L1 layers. Lower protocol layers of the SGi-mb interface include IP Unicast (IP UC) and L2/L1 layers. Lower protocol layers of the M1 interface include L2/L1 layers. Lower protocol layers of the LTE-Ue interface include Radio Link Control (RLC), Medium Access Control (MAC), and physical (PHY) layers.

As can be seen, two levels of IP Multicast transmission are involved. A user level of IP Multicast transmission is transparently passed from the BM-SC to the UE. The corresponding user level IP Multicast address is used by the UE to receive the MBMS user data. A transport level of IP Multicast transmission is used on the M1 interface between the MBMS-GW and the eNB. In this way, the MBMS user data can be efficiently distributed to all eNBs, which contribute to the MBSFN transmission of this MBMS user data.

In the illustrated concepts, the IP Multicast layer on the M1 interface may be used in such a way that multiple MBMS sessions may be allocated to the same IP Multicast group and may use the same IP Multicast address. The MBMS user data of these individual MBMS sessions may however be transmitted in separate GTP-U tunnels, using different C-TEIDs. In this way, multiplexing of the MBMS user data may be implemented in a highly efficient manner, without requiring excessive usage of IP Multicast groups and corresponding IP Multicast addresses. The benefits which can be achieved for multiplexing will be further explained in connection with FIG. 3.

Figure 3:
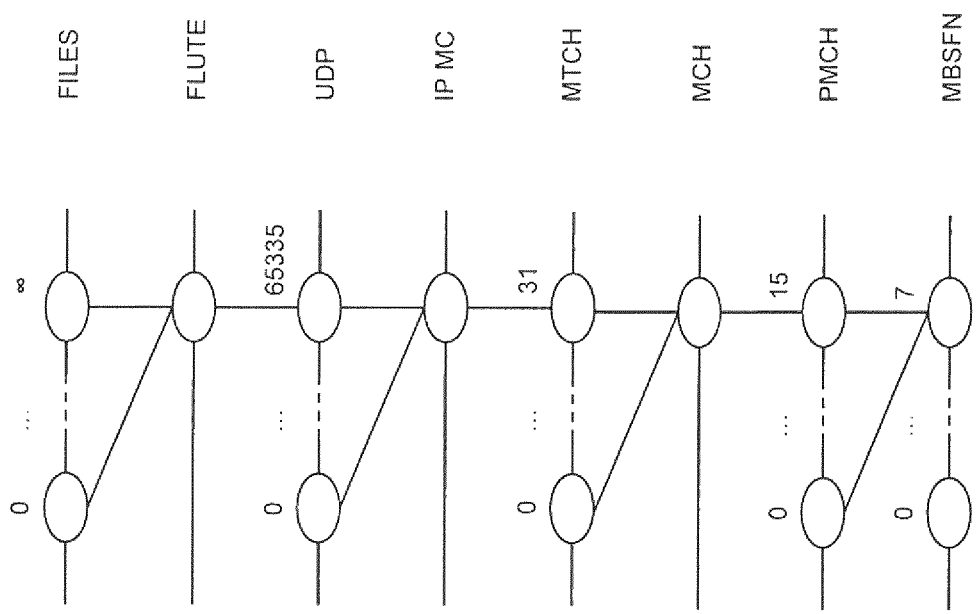
FIG. 3 schematically illustrates multiplexing in an MBMS architecture according to an embodiment of the invention.

FIG. 3 schematically illustrates the multiplexing of MBMS services to MBSFNs on the radio interface. Different multiplexing levels include a level in which multiple files are multiplexed into the FLUTE protocol, a level in which multiple UDP tunnels are multiplexed into a user level IP Multicast (IP MC) group, a level in which multiple logical channels on the radio interface, referred to as Multicast Traffic Channel (MTCH), are multiplexed into a transport channel on the radio interface, referred to as Multicast Channel (MCH), and a level in which multiple physical channels on the radio interface, referred to as Physical Multicast Channel are multiplexed into an MBSFN, which is typically served by multiple eNBs. An infinite number of files can be multiplexed into the FLUTE protocol, and up to 65336 UDP tunnels can be multiplexed into the user level IP Multicast Group. Up to 32 MTCHs can be multiplexed into the MCH, and up to 16 PMCHs can be multiplexed into the MBSFN. Up to 8 MBSFNs may be used in parallel. A number of MBMS sessions, i.e., different MTCHs, which may need to be supported in parallel may thus be in the range of thousand.

As can be seen, all MTCHs which are multiplexed into the same MCH are also transmitted in the same MBSFN. Accordingly, all the eNBs which contribute to this MBSFN to serve a certain geographical coverage area in which UEs can receive the MBMS session, referred to as MBMS Service Area (MSA), need to receive the MBMS user data of all these MTCHs anyway. As specified in 3GPP TS 29.061 V12.1.0, Section 17.7.6, the MSA may be defined by a list of Service Area Identities (SAIs). Accordingly, on the M1 interface the same transport level IP Multicast group can be used for transmitting the MBMS user data to these eNBs. The allocation of MBMS user plane data to a certain transport level IP Multicast group would need to be performed at the MBMS-GW, whereas the de-multiplexing of the MBMS user data from the transport level IP Multicast group to the MCHs would need to be performed at the eNB. The reuse of the same IP Multicast group for multiple MBMS sessions allows for reducing the required number of IP Multicast groups and IP Multicast addresses, and thereby for saving resources in the network.

Figure 4:
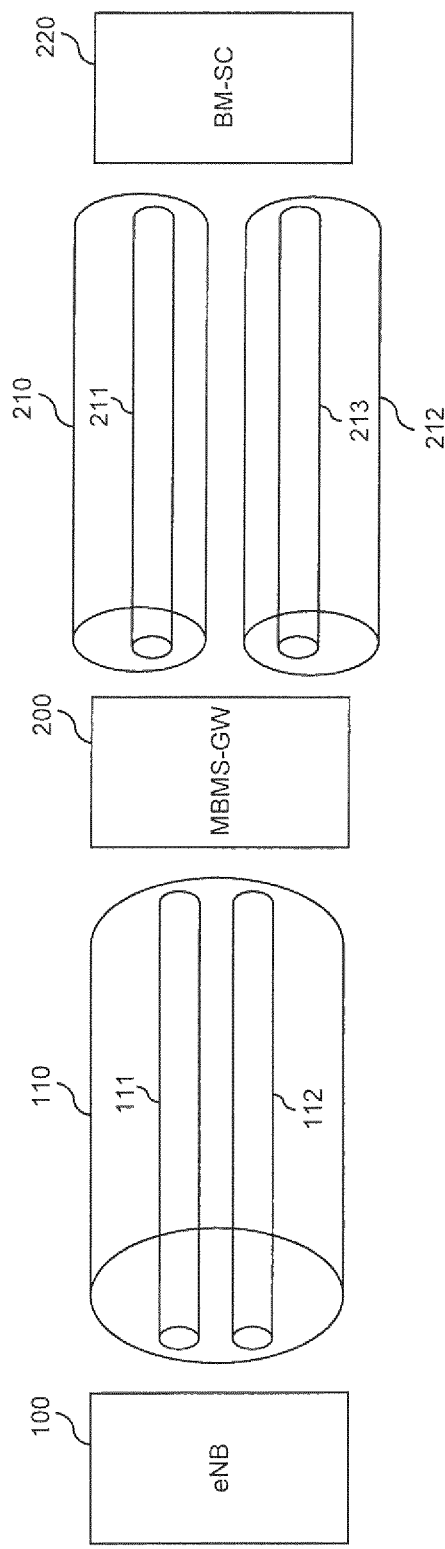
FIG. 4 schematically illustrates transport of multicast data of two multicast sessions in a single IP Multicast group according to an embodiment of the invention.

FIG. 4 illustrates an exemplary scenario in which the same IP Multicast group 110 is used for conveying MBMS user data of a first MBMS session 111 and of a second MBMS sessions 112 from the MBMS-GW 200 to the eNB 100. As illustrated, the BM-SC 220 provides the MBMS user data to the MBMS-GW 200. In the illustrated example, this is accomplished via the SGi-mb interface, using a first UDP tunnel 210 for carrying the MBMS user data 211 of the first MBMS session 111 and a second UDP tunnel 212 for carrying the MBMS user data 213 of the second MBMS session 112. As illustrated, unicast transmission may be used between the BM-SC 220 and the MBMS-GW 200. The first and second UDP tunnel 210, 212 may be associated with different UDP port numbers, and the MBMS-GW 200 may use the UDP port numbers to related the received MBMS user data 211, 213 to the corresponding MBMS session 111, 112. of the two MBMS sessions. Further, a different Temporary Mobile Group Identifier (TMGI) may be associated with each of the UDP tunnels 210, 212. It should be noted that other implementations of the transport of the MBMS user data from the BM-SC 220 to the MBMS-GW 200 may used as well, e.g., implementations using other protocols than UDP, such as TCP, implementations without tunnels, or implementations using multicast transmission rather than unicast transmission.

Within the IP Multicast group 110, the MBMS user data of the first and second MBMS sessions 111, 112 may be transmitted in separate GTP-U tunnels. That is to say, each of the MBMS sessions 111, 112 may be identified by a different C-TEID. The C-TEIDs may be used by the eNB 100 to relate the received MBMS user data to the corresponding MBMS session 111, 112 and for forwarding the MBMS user data to the correct MTCH.

A single IP Multicast packet transmitted between the MBMS-GW 200 and the eNB 100 may carry MBMS user data of only one of the MBMS session 111, 112. Alternatively, a single IP Multicast packet may carry multiple GTP-U packets of different MBMS sessions 111, 112 as payload. The number of GTP-U packets which is included into one IP Multicast packet may depend on the size of the GTP-U packets and a Maximum Transfer Unit (MTU) size between the MBMS-GW 200 and the eNB 100. If multiple GTP-U packets are included in one IP Multicast packet, the size field in the GTP-U header and the total size of the IP Multicast packet may be used by the eNB 100, to detect that there are multiple GTP-U packets in the IP Multicast packet. The size field in the GTP-U header may also be used to determine an offset from one GTP-U packet to the next GTP-U packet in the IP Multicast packet, which may be repeated until all GTP-U packets in the IP multicast packet have been detected.

Figure 5:
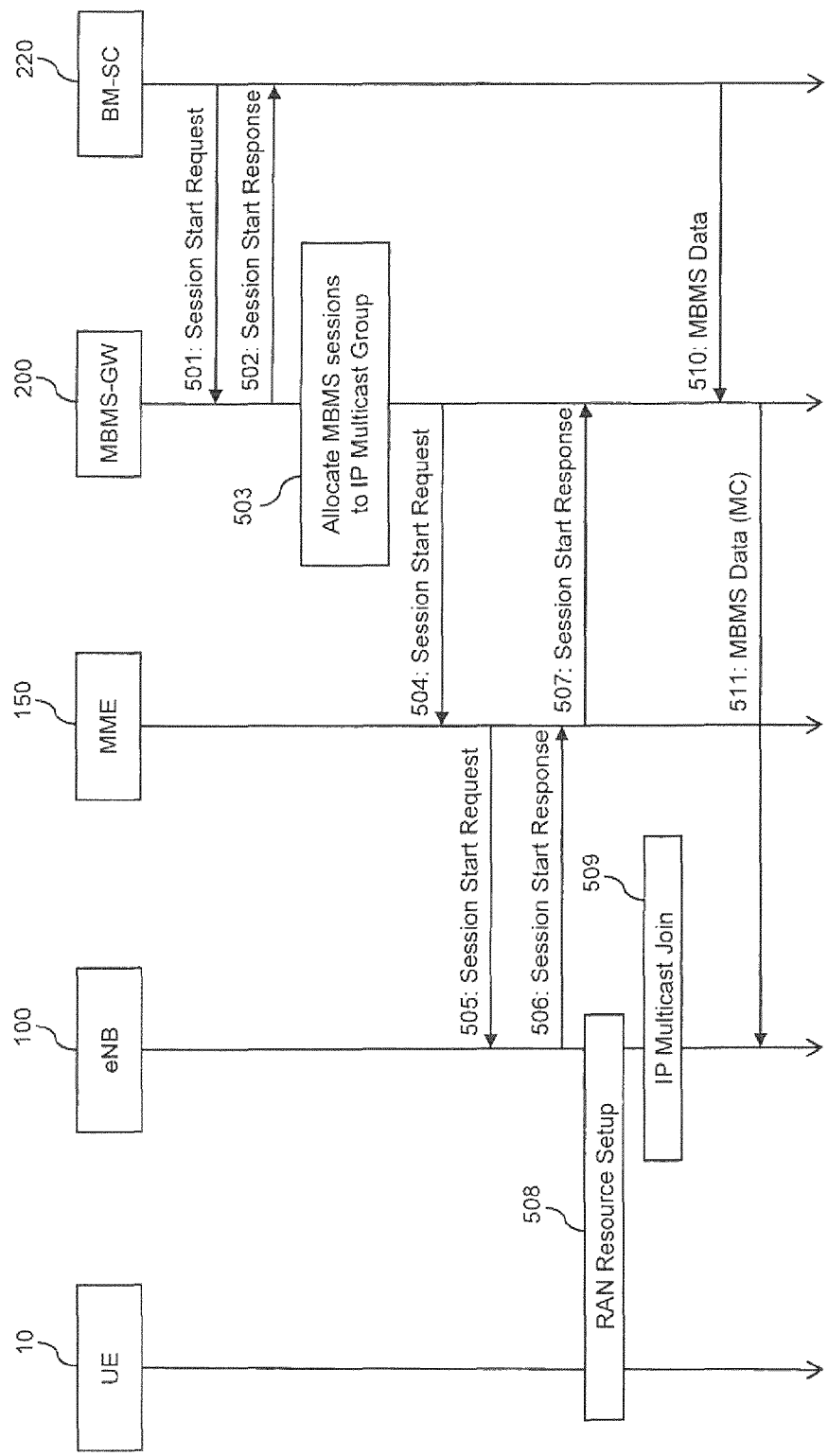
FIG. 5 shows signaling diagram for illustrating exemplary procedures for starting a multicast session according to an embodiment of the invention.

FIG. 5 illustrates exemplary procedures which may be used to enable the reuse of the same IP Multicast group on the M1 interface when starting a new MBMS session. The procedures are based on the MBMS session start procedures as specified in 3GPP TS 23.246 and involve the UE 10, the eNB 100, the MME 150, the MBMS-GW 200, and the BM-SC 220.

As illustrated, the BM-SC 220 may initially send a Session Start Request message 501 to the MBMS-GW 200. In this way, the BM-SC 220 may indicate the impending start of MBMS transmission and also indicate attributes of the MBMS session, such as a TMGI, a flow identifier, QoS, MSA, a session identifier, an estimated session duration, a list of downstream nodes for the MBMS session, i.e., MMEs to be used for controlling the eNBs involved in transmission of the MBMS session, a time until MBMS data transfer, a time of MBMS data transfer start, an access indicator, or the like.

As further illustrated, the MBMS-GW 200 responds with a Session Start Response message 502 to the BM-SC 220. The Session Start Response message 502 may include information for the BM-SC 220 to send MBMS user data to the MBMS GW 200. Further, the MBMS-GW 200 may create an MBMS bearer context, in which the attributes of the MBMS session are stored.

Moreover, as illustrated by step 503, the MBMS-GW 200 may allocate the new MBMS session to an IP Multicast group which is also used for conveying MBMS user data of other MBMS sessions via the M1 interface to eNBs. That is to say, the MBMS-GW 200 may perform allocation of multiple MBMS sessions to the same IP Multicast group. In addition, the MBMS-GW 200 also determines the IP Multicast address of this IP Multicast group and allocates a C-TEID for the new MBMS session. The C-TEID is selected to be different from C-TEIDs used for other MBMS sessions allocated to the IP Multicast group.

As further illustrated, the MBMS-GW 200 proceeds by sending a Session Start Request message 504 to the MME 150. The Session Start Request message 504 indicates the IP Multicast address and C-TEID as determined for this MBMS session. Further, the Session Start Request message 504 may also indicate other attributes of the MBMS session, e.g., TMGI, Flow Identifier, QoS, MSA, session identifier, estimated session duration, IP address of the multicast source (i.e., IP address of the MBMS-GW 200), or the like.

The MME 150 may then create an MBMS bearer context, in which the attributes of the MBMS session are stored. Further, the MME 150 sends a Session Start Request message 505 to the eNB 100. The Session Start Request message 505 indicates the IP Multicast address and C-TEID as determined for this MBMS session. Further, the Session Start Request message 505 may also indicate other attributes of the MBMS session, e.g., TMGI, Flow Identifier, QoS, MSA, session identifier, estimated session duration, IP address of the multicast source (i.e., IP address of the MBMS-GW 200), or the like.

The eNB 100 may then create an MBMS bearer context, in which the attributes of the MBMS session are stored. Further, the eNB 100 responds to the MME 150 with a Session Start Response message 506, thereby confirming receipt of the Session Start Request message and indicating acceptance of session start. The MME 150 may then update the MBMS bearer context of this MBMS session, e.g., by including an identifier of the eNB in a list of downstream nodes for this MBMS session. Further, the MME 150 may respond to the MBMS-GW 200 with a Session Start Response message 507, thereby indicating to the MBMS-GW 200 that session start was accepted by the eNB 100.

As indicated by step 508, the eNB 100 may also perform steps to setup RAN radio resources for the transfer of the MBMS user data of the new MBMS session. Further, as indicated by step 509, the eNB 100 may join the IP Multicast distribution of the IP Multicast group to which the MBMS session is allocated for transport over the M1 interface. This joining of the IP Multicast distribution is needed only if the eNB 100 has not previously joined the IP Multicast distribution of this IP Multicast group, e.g., when starting another MBMS session of the IP Multicast group. Accordingly, the eNB 100 may be perform this joining only once for this IP Multicast group. When the MBMS session stops, the eNB 100 may send a report towards the MBMS GW 200 in order to leave the IP Multicast distribution. However, this leaving of the IP Multicast distribution may be suppressed if other MBMS sessions of the IP Multicast group are still active. That is to say, the eNB 100 may leave the IP Multicast distribution at session stop of the last MBMS session of the IP Multicast group. In this way, distribution of the MBMS user data by the MBMS gateway 200 using the shared transport level IP Multicast group may continue until all MBMS sessions of this group have stopped.

The BM-SC 220 may then start sending the MBMS user data 510 of the new MBMS session to the MBMS-GW 200, and the MBMS-GW 200 may forward the MBMS user data 511 using IP Multicast Distribution to the IP Multicast Address determined at step 503.

As mentioned above, the MBMS-GW 200 may be responsible for allocation of multiple MBMS sessions to the same IP Multicast group for transport on the M1 interface. However, this allocation is not a straightforward task for the MBMS-GW 200 because the MBMS-GW 200 may for example not be aware to which MCH the MTCH of a new MBMS session is multiplexed. In the following, exemplary methods for allocating a new MBMS session to an IP Multicast group for transport on the M1 interface will be explained with reference to FIGS. 6 to 8. As can be seen, such methods may be based on evaluation of information from MBMS bearer contexts at the MBMS-GW.

Figure 6:
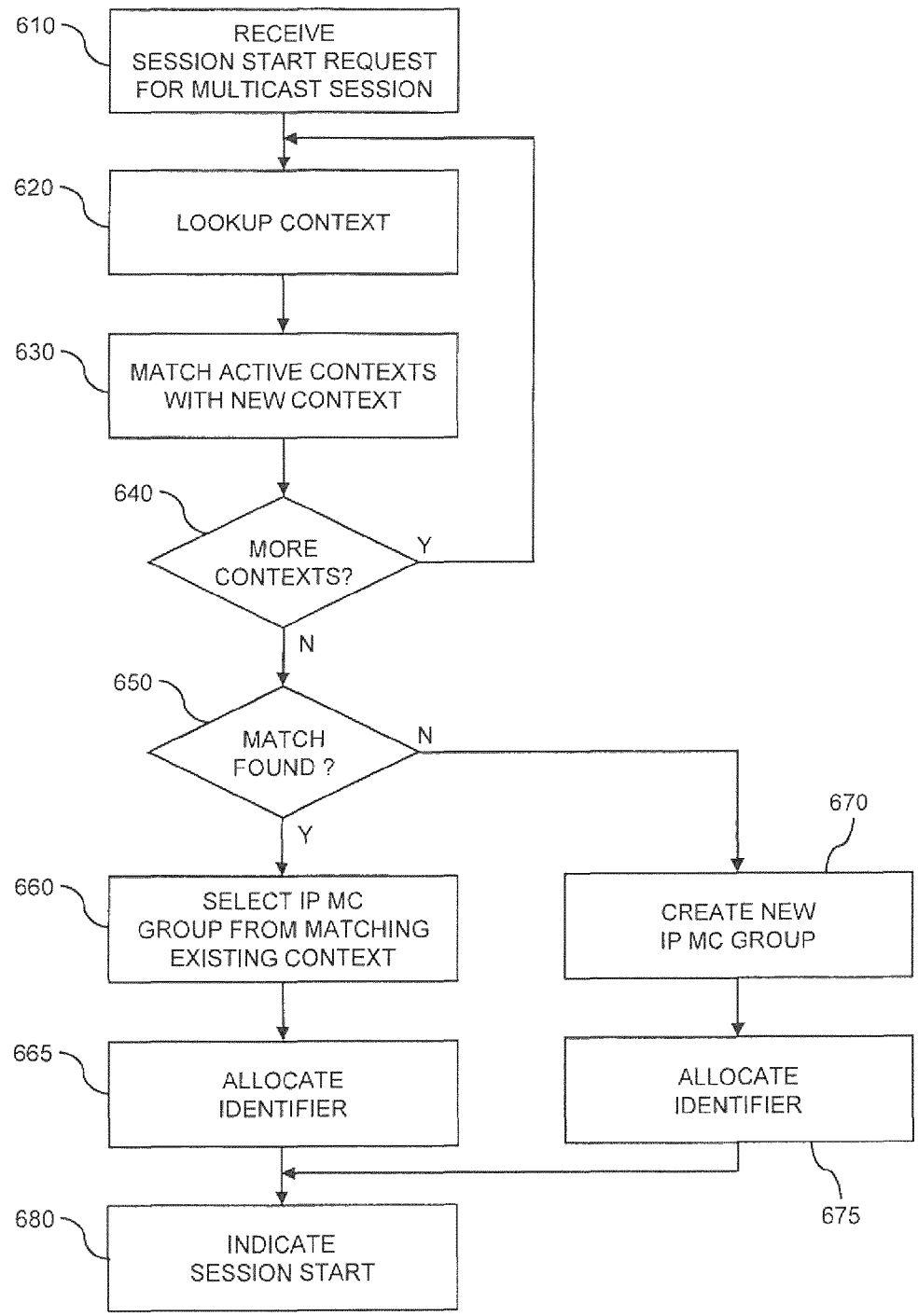
FIG. 6 shows a flowchart for illustrating a method according to an embodiment of the invention, which may be used for determining a set of multicast sessions to be allocated to the same IP Multicast group.

In the method of FIG. 6, the MBMS-GW 200 may match the MBMS bearer context of the MBMS session with existing MBMS bearer contexts to check whether an existing IP Multicast group for transport on the M1 interface may be reused for a new MBMS session. This matching of contexts may for example be based on the MSA defined in the MBMS bearer context, i.e., the matching may be performed to find an existing MBMS bearer context with an MSA that matches the MSA of the new MBMS session. Alternatively, this matching may also be based on the list of downstream nodes defined in the MBMS bearer context, i.e., the matching may be performed to find an existing MBMS bearer context with a list of downstream nodes that matches the list of downstream nodes of the new MBMS session. The list of downstream nodes will include one or more MMEs which control the eNBs involved in transmission of the MBMS session. The list of downstream nodes may be regarded as a course grain description of the geographical coverage area of the MBMS session.

At step 610, the MBMS-GW 200 receives the Session Start Request for the new MBMS session. The Session Start Request indicates attributes of the new MBMS session, such as the MSA or list of downstream nodes. As mentioned above, such attributes may be stored by the MBMS-GW 200 in the MBMS bearer context for the new session.

At step 620, the MBMS-GW 200 looks up an existing MBMS bearer context, in which attributes of an existing active MBMS session are stored. Again, such attributes may include an MSA or list of downstream nodes.

At step 630, the MBMS-GW 200 matches the MBMS bearer context of the new MBMS session with the existing MBMS bearer context. In some scenarios, this may be accomplished with respect to the MSA. For example, a match may be determined if the MSA of the new MBMS session is identical to the MSA of the existing bearer context. A match could also be determined if the MSA of the new MBMS session is smaller than the MSA of the existing MBMS bearer context, but completely covered by the latter.

At step 640, the MBMS-GW 200 checks whether more existing MBMS bearer contexts are stored in the MBMS-GW 200. If this is the case, as indicated by branch "Y", the method returns to step 620, where the MBMS-GW looks up a further existing MBMS bearer context, and repeats the matching of step 630 with the further existing MBMS bearer context.

If step 640 reveals that there are no further existing MBMS bearer contexts, the method continues with step 650, as indicated by branch "N".

At step 650, the MBMS-GW 200 checks whether a matching existing MBMS bearer context was found at step 630. If this is the case, as indicated by branch "Y", the method continues with step 660.

At step 660, the MBMS-GW 200 selects the IP Multicast group of the matching existing MBMS bearer context to be reused for the new MBMS session. Accordingly, the MBMS-GW 200 allocates the new MBMS session to this IP Multicast group and to the IP Multicast address of this IP Multicast group.

At step 665, the MBMS-GW 200 allocates a C-TEID for the new MBMS session. This is accomplished in such a way that the C-TEID is different from the C-TEID of every other MBMS session allocated to the IP Multicast group.

At step 680, the MBMS-GW 200 sends a Session Start Request to indicate the allocated IP Multicast address and C-TEID to the eNBs involved in transmission of the new MBMS session. As mentioned above, this may be accomplished indirectly via an MME or via multiple MMEs. In particular, the Session Start Request may be sent to all MMEs indicated in the list of downstream nodes received at step 610.

If the check of step 650 reveals that there is no matching existing MBMS bearer context, the method continues with step 670, as indicated by branch "N".

At step 670, the MBMS-GW 200 creates a new IP Multicast group for transport on the M1 interface and allocates the new MBMS session to this newly created IP Multicast group. Further, the MBMS-GW 200 allocates an IP Multicast address for the newly created IP Multicast group. At step 675, the MBMS-GW 200 allocates a C-TEID for the new MBMS session.

The method then continues with step 680, where the Session Start Request is sent to indicate the allocated IP Multicast address and C-TEID to the eNBs involved in transmission of the new MBMS session, as explained above.

If the matching of step 630 is performed as explained above on to identify identical MSAs or existing MBMS bearer contexts which completely cover the MSA of the new MBMS session, the MBMS user data of the new MBMS session will be delivered only to those eNBs which participate in MBSFN transmission of the MBMS user data. Accordingly, an increase of backhaul traffic to eNBs due to the reuse of the IP Multicast group on the M1 interface can be avoided.

In some scenarios, the matching of step 630 may also be performed with respect to another attribute than the MSA, in particular with respect to the list of downstream nodes. This allows for a more coarse grained matching, with higher probability to yield a match. However, since an matching list of downstream nodes may be associated with non-overlapping MSAs, this also means that some eNBs receive MBMS user data of MBMS sessions for which they do not participate in the MBSFN transmission. The eNB may discard such MBMS data by applying suitable filtering mechanisms, e.g., using the indicated C-TEID(s) of MBMS sessions where the eNB participates in the MBSFN transmission.

Figure 7:
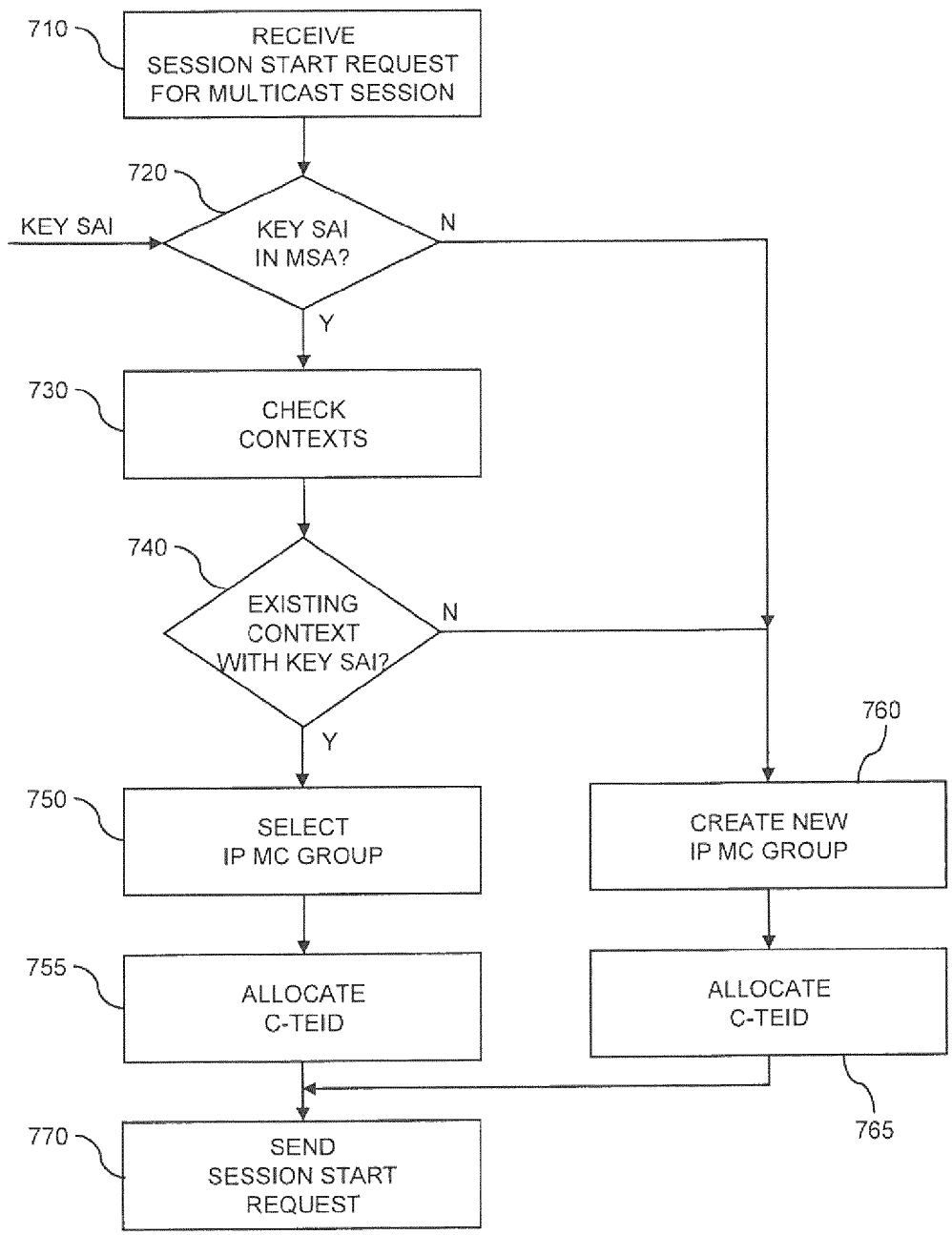
FIG. 7 shows a flowchart for illustrating a further method according to an embodiment of the invention, which may be used for determining a set of multicast sessions to be allocated to the same IP Multicast group.

In the method of FIG. 7, the MBMS-GW 200 may evaluate the MSA of the MBMS bearer context to check whether an existing IP Multicast group for transport on the M1 interface may be reused for a new MBMS session. This is accomplished by comparison to a predefined area. In particular, the MBMS-GW 200 may check whether the MSA of the new MBMS session includes a certain predefined area. Such predefined area may be defined in terms of an area identifier, e.g., similar to the SAIs used for defining the MSA. In the following, the area identifier used to defined the predefined area will be also referred to as key Service Area Identifier (key-SAI).

At step 710, the MBMS-GW 200 receives the Session Start Request for the new MBMS session. The Session Star Request indicates attributes of the new MBMS session, such as the MSA or list of downstream nodes. As mentioned above, such attributes may be stored by the MBMS-GW 200 in the MBMS bearer context for the new session.

At step 720, the MBMS-GW 200 checks whether a key-SAI configured in the MBMS-GW 200 is included in the MSA of the new MBMS session. In some scenarios, the MBMS-GW may also be configured with a list of key-SAIs, and the check may be performed with respect to each key-SAI in the list.

If the check of step 720 reveals that a certain key-SAI is included in the MSA of the new MBMS session, the method continues with step 730, as indicated by branch "Y".

At step 730, the MBMS-GW 200 checks the existing MBMS bearer contexts stored in the MBMS-GW 200. In particular, the MBMS-GW 200 may check the existing MBMS bearer contexts for an MSA including the key-SAI, as indicated by step 740. If such existing context with the key-SAI in the MSA is identified, the method continues with step 750, as indicated by branch "Y":

At step 750, the MBMS-GW 200 selects the IP Multicast group of the identified existing MBMS bearer context to be reused for the new MBMS session. Accordingly, the MBMS-GW 200 allocates the new MBMS session to this IP Multicast group and to the IP Multicast address of this IP Multicast group.

At step 755, the MBMS-GW 200 allocates a C-TEID for the new MBMS session. This is accomplished in such a way that the C-TEID is different from the C-TEID of every other MBMS session allocated to the IP Multicast group.

At step 770, the MBMS-GW 200 sends a Session Start Request to indicate the allocated IP Multicast address and C-TEID to the eNBs involved in transmission of the new MBMS session. As mentioned above, this may be accomplished indirectly via an MME or via multiple MMEs. In particular, the Session Start Request may be sent to all MMEs indicated in the list of downstream nodes received at step 710.

If the check of step 740 reveals that there is no existing MBMS bearer context with the key-SAI, the method continues with step 760, as indicated by branch "N".

At step 760, the MBMS-GW 200 creates a new IP Multicast group for transport on the M1 interface and allocates the new MBMS session to this newly created IP Multicast group.

Further, the MBMS-GW 200 allocates an IP Multicast address for the newly created IP Multicast group. At step 765, the MBMS-GW 200 allocates a C-TEID for the new MBMS session.

The method then continues with step 770, where the Session Start Request is sent to indicate the allocated IP Multicast address and C-TEID to the eNBs involved in transmission of the new MBMS session, as explained above.

If the check of step 720 reveals that no configured key-SAI is includes in the MSA of the new MBMS session, the method may proceed directly to step 760, where a new IP Multicast group for transport on the M1 interface is created and proceed as explained above.

The key-SAI(s) as used in the method of FIG. 7 may be used to define a tailored overlap precision between the MSAs of different MBMS sessions. For example, such key-SAIs may be used to define the overlapping area in such a way that overlap is required in areas with high expected traffic load. In such areas, increased backhaul traffic due to the reuse of the IP Multicast group for transport over the M1 interface can be avoided. In other areas, which can expected to be less susceptible to overload, such increased backhaul traffic may be tolerated.

Figure 8:
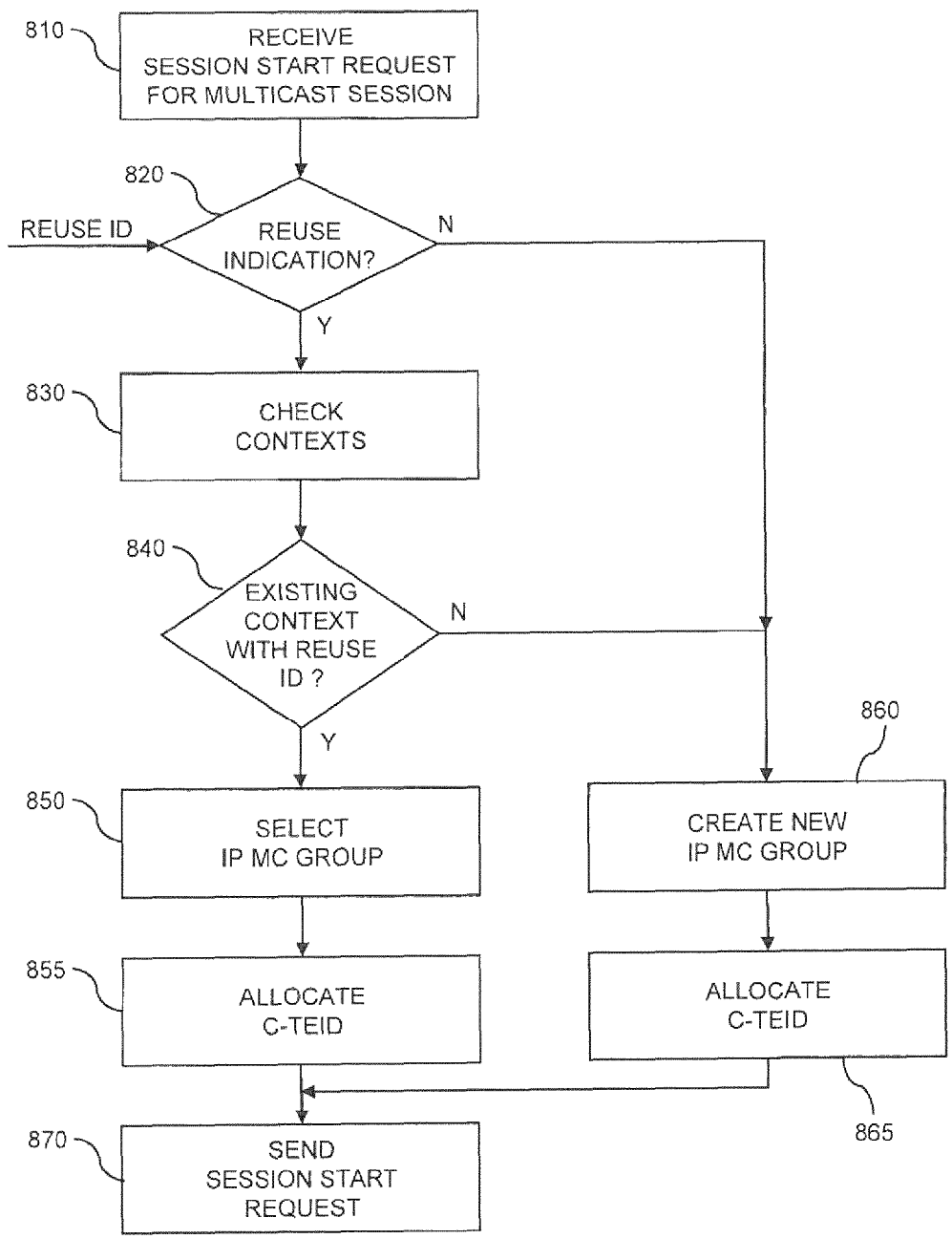
FIG. 8 shows a flowchart for illustrating a further method according to an embodiment of the invention, which may be used for determining a set of multicast sessions to be allocated to the same IP Multicast group.

In the method of FIG. 8, the MBMS-GW 200 use an indication from the BM-SC 220 to check whether an existing IP Multicast group for transport on the M1 interface may be reused for a new MBMS session. This indication may be received from the BM-SC 220 over the SGmb interface, e.g., using a corresponding Attribute Value Pair (AVP) in the Diameter based protocol of the SGmb interface. In this way, awareness of the BM-SC 220 about geographical coverage of a certain MBMS session may be utilized in the allocation. Alternatively, the BM-SC 220 may receive the information for this indication from another node.

At step 810, the MBMS-GW 200 receives the Session Start Request for the new MBMS session. The Session Star Request indicates attributes of the new MBMS session, such as the MSA or list of downstream nodes. As mentioned above, such attributes may be stored by the MBMS-GW 200 in the MBMS bearer context for the new session.

At step 820, the MBMS-GW 200 checks whether a reuse identifier (reuse ID) is provided for the new MBMS session. The reuse identifier may be received from the BM-SC 220, e.g., in a corresponding AVP of the Diameter based protocol of the SGmb interface. The reuse ID may for example be received together with other attributes of the new MBMS session in the Session Start Request of step 710, and may be stored in the MBMS bearer context of the MBMS session.

If the check of step 820 reveals that a reuse ID is provided for the new MBMS session, the method continues with step 830, as indicated by branch "Y".

At step 830, the MBMS-GW 200 checks the existing MBMS bearer contexts stored in the MBMS-GW 200. In particular, the MBMS-GW 200 may check the existing MBMS bearer contexts for the reuse ID, as indicated by step 840. If such existing context with the reuse ID is identified, the method continues with step 850, as indicated by branch "Y":

At step 850, the MBMS-GW 200 selects the IP Multicast group of the identified existing MBMS bearer context to be reused for the new MBMS session. Accordingly, the MBMS-GW 200 allocates the new MBMS session to this IP Multicast group and to the IP Multicast address of this IP Multicast group.

At step 855, the MBMS-GW 200 allocates a C-TEID for the new MBMS session. This is accomplished in such a way that the C-TEID is different from the C-TEID of every other MBMS session allocated to the IP Multicast group.

At step 870, the MBMS-GW 200 sends a Session Start Request to indicate the allocated IP Multicast address and C-TEID to the eNBs involved in transmission of the new MBMS session. As mentioned above, this may be accomplished indirectly via an MME or via multiple MMEs. In particular, the Session Start Request may be sent to all MMEs indicated in the list of downstream nodes received at step 710.

If the check of step 840 reveals that there is no existing MBMS bearer context with the reuse ID, the method continues with step 860, as indicated by branch "N".

At step 860, the MBMS-GW 200 creates a new IP Multicast group for transport on the M1 interface and allocates the new MBMS session to this newly created IP Multicast group. Further, the MBMS-GW 200 allocates an IP Multicast address for the newly created IP Multicast group. At step 865, the MBMS-GW 200 allocates a C-TEID for the new MBMS session.

The method then continues with step 870, where the Session Start Request is sent to indicate the allocated IP Multicast address and C-TEID to the eNBs involved in transmission of the new MBMS session, as explained above.

If the check of step 820 reveals that no reuse ID is provided for the new MBMS session, the method may proceed directly to step 860, where a new IP Multicast group for transport on the M1 interface is created and proceed as explained above.

The reuse ID as used in the method of FIG. 8 allows the BM-SC 220 to control the reuse of the IP Multicast group for transport over the M1 interface for multiple MBMS sessions. In this way awareness of the BM-SC 220 with respect to the intended coverage of the MBMS session may be utilized in the allocation process.

It is noted that the above methods are exemplary and may be modified in various ways. For example, rather than defining the predefined are in the method of FIG. 7 in terms of one or more key-SAIs, one or more predefined areas could be defined in term of an MSA template, which may then be evaluated for an identical match in a similar way as explained in connection with step 630 of FIG. 6. Further, also a larger predefined area could be defined, e.g., in terms of a combination of possible MSAs, and it could be checked whether the MSA of the new MBMS session is included in this larger predefined area.

Figure 9:
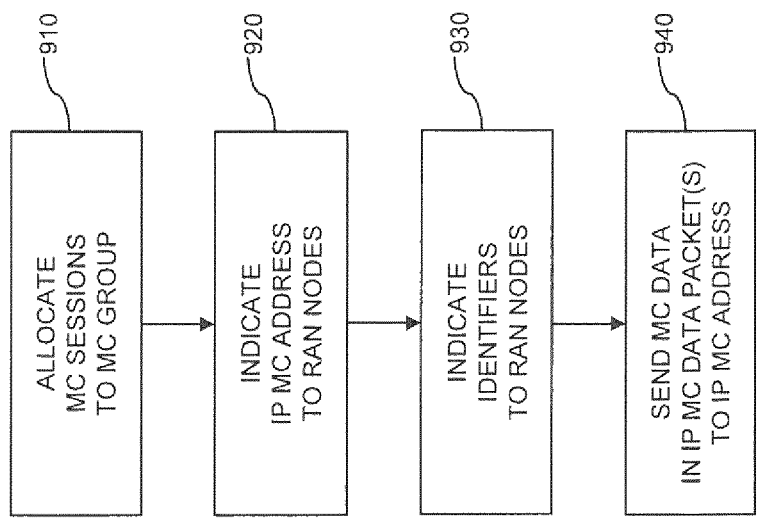
FIG. 9 shows a flowchart for illustrating a method for implementing multicast transport according to an embodiment of the invention in a gateway.

FIG. 9 shows a flowchart for illustrating a method for controlling transmission of multicast data in a cellular network. The method of FIG. 9 may be used to implement the above-described concepts in a gateway of the cellular network, e.g., in the MBMS-GW 200.

At step 910, the gateway allocates a set of multicast sessions to a single IP Multicast group. The multicast sessions may be MBMS sessions, and the IP Multicast group may be used for transport of the multicast data to a RAN node of the cellular network, e.g., via the above-mentioned M1 interface. The RAN node may for example be a base station, such as the eNB 100. In some implementations, the RAN node may also be a base station controller, such as an RNC of the UMTS radio access technology or a Base Station Controller (BSC) of the GSM/GPRS radio access technology.

The determination of the set of multicast sessions may be accomplished in various ways. For example, the set of multicast sessions may be determined to have overlapping multicast service areas, e.g., MSAs. Examples of methods which allow for a corresponding determination are explained in connection with FIGS. 6 to 8.

In some scenarios, the gateway may determine the set of multicast sessions by assigning a further multicast session to the set if the multicast service area of the further multicast session at least partially overlaps with the multicast service area of one ore more multicast sessions already assigned to the set. The methods of FIGS. 6 and 7 are based on this idea. In the method of FIG. 6, the matching of MSAs of different MBMS sessions may be used to ensure that the MSAs of the different MBMS sessions are identical or overlap at least partially. In the method of FIG. 7, the key-SAI(s) ensure an overlap between the MSAs of the different MBMS sessions. In some scenarios, the gateway may determine the set of multicast sessions by assigning a further multicast session to the set if the multicast service area of the further multicast session is completely covered by the multicast service area of one ore more multicast sessions already assigned to the set. This requirement is for example used by the method of FIG. 6, when performing the matching of MSAs at step 630.

In some scenarios, the gateway may determine the set of multicast sessions by assigning a further multicast session to the set if the multicast service area of the further multicast session includes a predefined area configured in the gateway. The predefined area may for example be defined in terms of one or more SAIs. A corresponding requirement is for example used by the method of FIG. 7, when checking for the presence of one or more key-SAIs in the MSA of the new MBMS session.

In some scenarios, the set of multicast sessions may be determined in such a way that the multicast service areas of the multicast sessions of the set are included in a predefined area configured in the gateway. As mentioned in connection with FIG. 7, such larger predefined area could be used to check whether the MSA of the new MBMS session is in the same predefined area as existing MBMS sessions. Such larger predefined area may for example correspond to a combination list of possible MSAs.

In some scenarios, the gateway may receive control information from a further node, from which the gateway also receives the multicast data. An example of such further node is the BM-SC 220. On the basis of control information, the gateway may determine the set of multicast sessions. An example of using such control information is given by the method of FIG. 8. The control information may for example be an identifier which indicates that the IP Multicast group of a certain multicast session may also be used for other multicast sessions. The identifier may at the same time specify a certain IP Multicast group.

In some scenarios, the gateway may determine the set of multicast sessions depending on an identity of a control node of the at least one RAN node. An example of such usage of the identity of a control node is given by the method of FIG. 6, when performing the matching of step 630 on the basis of the list of downstream nodes. The set of multicast sessions may for example be determined in such a way that all RAN node involved in transmission of the multicast sessions are controlled by a control node from a predefined list of common control nodes. An example of such list of control nodes is the above-mentioned list of downstream nodes stored in the MBMS bearer context of the MBMS-GW 200.

At step 920, the gateway indicates an IP Multicast address of the IP Multicast group to at least one RAN node of the cellular network. This is accomplished for each of the multicast sessions. As mentioned above, the RAN node may be a base station, such as the eNB 100, or a base station controller, such as an RNC of the UMTS radio access technology or a BSC of the GSM/GPRS radio access technology. The indication of step 920 may be transmitted over a control plane interface of the gateway. As explained above, the indication may be transmitted via an intermediate control node to the RAN node, such as via the MME 150. The indication may correspond to or be included in a Session Start Request message, such as the Session Start Request message 504 of FIG. 5.

At step 930, the gateway indicates an identifier to the at least one RAN node. This is accomplished for each of the multicast sessions, e.g., using the same control signaling as for the indication of step 920. A different identifier is allocated for each of the multicast sessions. The identifier may for example be a TEID, e.g., a C-TEID of the GTP-U protocol.

At step 940, the gateway sends multicast data of the multicast sessions in one or more IP Multicast data packets addressed to the IP Multicast address of the IP Multicast group. The multicast data of each of the multicast sessions include the respective identifier to identify the multicast session. On the basis of the identifier, a recipient of the multicast data, i.e., one of the RAN nodes, may distinguish the multicast data of the different multicast sessions from each other, so that the multicast data can be forwarded to a corresponding multicast radio channel. In particular, the multicast data of different multicast data can be forwarded to different multicast radio channels. An example of such multicast radio channel is the above-mentioned MTCH. In some scenarios, the gateway may send multicast data of at least two of the multicast sessions in the same IP Multicast data packet, e.g., by multiplexing GTP-U data packets into one IP Multicast data packet.

Figure 10:
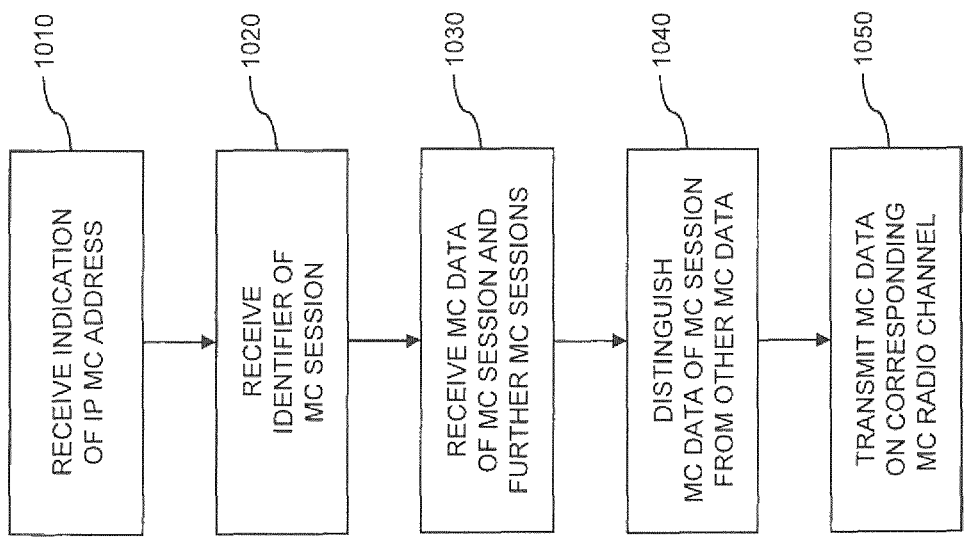
FIG. 10 shows a flowchart for illustrating a method for implementing multicast transport according to an embodiment of the invention in a RAN node.

FIG. 10 shows a flowchart for illustrating a method for controlling transmission of multicast data in a cellular network. The method of FIG. 10 may be used to implement the above-described concepts in a RAN node of the cellular network. The RAN node may for example be a base station, such as the eNB 100. In some implementations, the RAN node may also be a base station controller, such as an RNC of the UMTS radio access technology or a BSC of the GSM/GPRS radio access technology.

At step 1010, the RAN node receives an indication for a multicast session from a gateway of the cellular network, e.g., from the MBMS-GW 200. The indication specifically indicates an IP Multicast address of an IP Multicast group to which the multicast session is allocated. At least one further multicast session is also allocated to the IP Multicast group. The multicast sessions may be MBMS sessions, and the IP Multicast group may be used for transport of the multicast data to from the gateway to the RAN node, e.g., via the above-mentioned M1 interface. The indication of step 1010 may be received via a control plane interface of the RAN node. As explained above, the indication may be received from the gateway via an intermediate control node, such as via the MME 150. The indication may correspond to or be included in a Session Start Request message, such as the Session Start Request message 504 of FIG. 5.

The multicast session and the at least one further multicast session may have been allocated to the IP Multicast group using various criteria. For example, the multicast session and the at least one further multicast session may have overlapping multicast service areas, e.g., overlapping MSAs. Further, the RAN node and all other radio access network nodes transmitting the multicast session and the at least one further multicast session may be controlled by a control node from a predefined list of control nodes. Further, the multicast session and the at least one further multicast session may have multicast service areas which are included in a predefined area. Accordingly, allocation of the multicast sessions to the IP Multicast group may have been accomplished as explained in connection with step 910 of FIG. 9, or specifically as explained in connection with FIG. 6, 7, or 8.

At step 1020, the RAN node receives an identifier of the multicast session from the gateway, e.g., using the same control signaling as for receiving the indication of step 1010. The identifier may for example be a TEID, e.g., a C-TEID of the GTP-U protocol. The identifier allows for distinguishing the multicast data of the multicast session from the multicast data of the further multicast session, i.e., it may be regarded as uniquely assigned to the multicast session. The RAN node may also receive an identifier of the further multicast session from the gateway. In such cases, the identifiers of the multicast session and of the further multicast session would be different.

At step 1030, the RAN node receives multicast data of the multicast session and of the at least one further multicast session. This is accomplished in one or more IP Multicast data packets addressed to the IP Multicast address of the IP Multicast group. The multicast data of the multicast session comprises the indicated identifier. Similarly, also the multicast data of the at least one further multicast session may comprise a corresponding identifier. However, the identifier of the further multicast session may not have been indicated to the RAN node. In some scenarios, the RAN node may receive multicast data of the multicast session and of the further multicast session in the same IP Multicast data packet, e.g., if GTP-U data packets of the two multicast sessions are multiplexed into one IP Multicast data packet.

At step 1040, the RAN node distinguishes the multicast data of the multicast session from the multicast data of the at least one further multicast session. This is accomplished on the basis of the identifier received at step 1020. This may also involve filtering the received multicast data on the basis of the identifier received at step 1020, e.g., by discarding multicast data which are not needed at the RAN node.

At step 1050, the RAN node forwards the multicast data of the multicast session to a corresponding multicast radio channel. An example of such multicast radio channel is the above-mentioned MTCH. This multicast radio channel may be different from a multicast radio channel used for transmission of the multicast data of the further multicast channel.

As can be seen, the methods of FIGS. 9 and 10 may be combined with each other in a system which includes at least the gateway and the RAN node. In such system, the method of FIG. 9 may be used to perform the allocation of multicast sessions to the same IP Multicast group and to send the multicast data to the RAN node, and the method of FIG. 10 may be used to receive the indications concerning the allocation of multicast sessions and the multicast data, and to forward the multicast data to the multicast radio channel.

Figure 11:
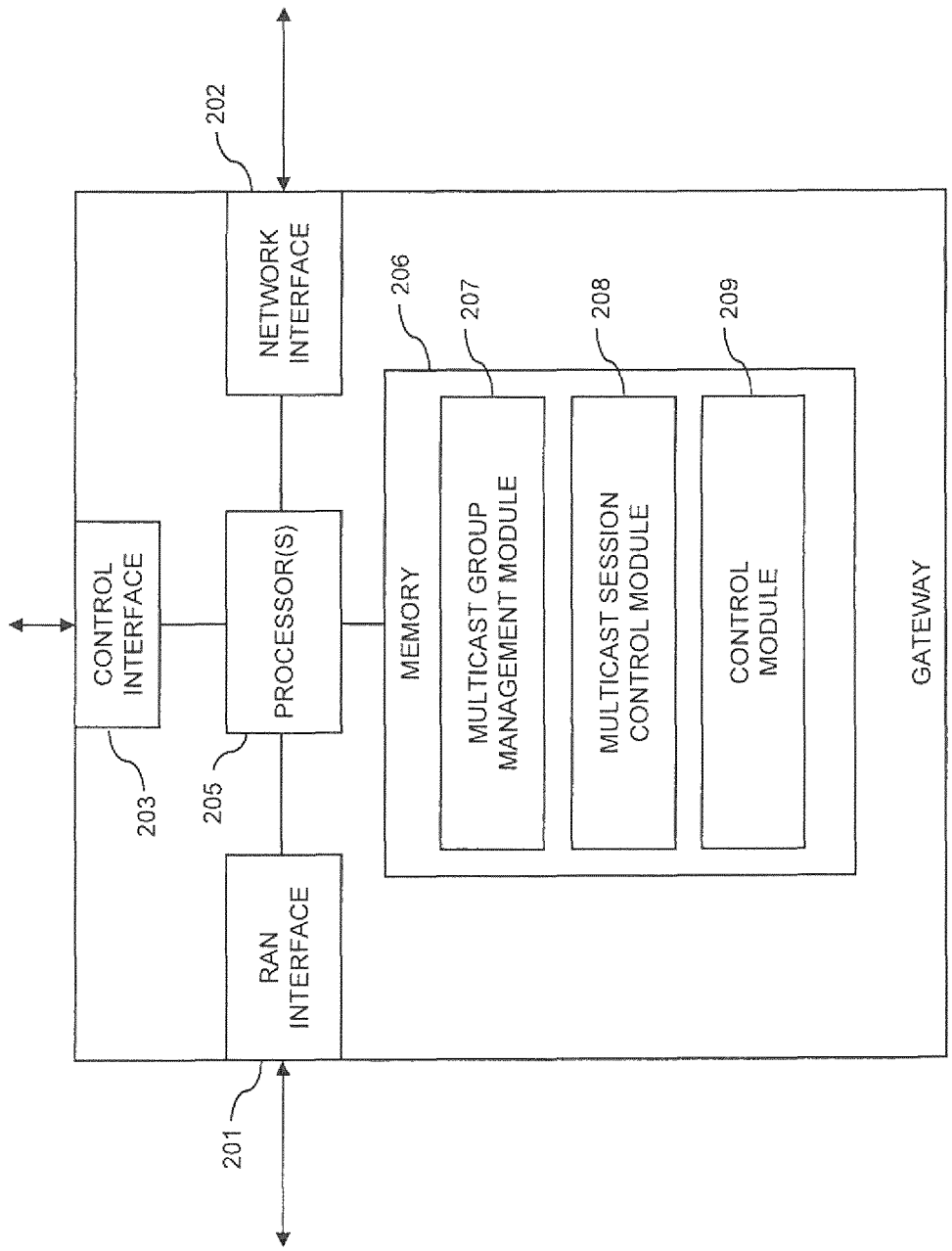
FIG. 11 schematically illustrates structures of a gateway according to an embodiment of the invention.

FIG. 11 illustrates exemplary structures which may be used to implement the above concepts in a gateway for a cellular network. For example, the gateway may correspond to the above-mentioned MBMS-GW 200. However, other types of gateways could be implemented as well, e.g., a GGSN.

In the illustrated example, the gateway includes a RAN interface 201 which may be used for transport of multicast data to a RAN node, e.g., to the eNB 100. The RAN interface 201 may for example be implemented by the above-mentioned M1 interface. As further illustrated, the gateway may also include a network interface 202 which may be used for receiving multicast data from a further node of the cellular network, such as the BM-SC 220. The network interface 202 may for example be implemented by the above-mentioned SGi interface. As further illustrated, the gateway may also include a control interface 203 which may be used for sending and receiving control plane signaling. The control interface 203 may for example be implemented by the above-mentioned Sm interface.

Further, the gateway includes one or more processor(s) 205 coupled to the interfaces 201, 202, 203 and a memory 206 coupled to the processor(s) 205. The memory 206 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 206 includes suitably configured program code to be executed by the processor(s) 205 so as to implement the above-described functionalities of the gateway. More specifically, the program code in the memory 206 may include a multicast group management module 207 so as to implement the above-described functionalities of allocating multicast sessions to the same IP Multicast group. Further, the program code in the memory 206 may also include a multicast session control module 208 so as to implement the above-mentioned functionalities for controlling multicast sessions, e.g., allocating the identifier, by sending indications to other nodes, or by receiving indications from other nodes. Further, the program code in the memory 206 may also include a control module 209 so as to implement generic control functionalities of the gateway, e.g., for handling different protocols as used for transmission of control plane data or user plane data.

It is to be understood that the structure as illustrated in FIG. 11 is merely schematic and that the gateway may actually include further components which, for the sake of clarity, have not been illustrated, e.g., further interfaces or further processors. Further, it is to be understood that functionalities of two or more of the illustrated interfaces 201, 202, 203 may be combined in a single interface. Also, it is to be understood that the memory 206 may include further types of program code modules, which have not been illustrated, e.g., program code modules for implementing known functionalities of an MBMS-GW or similar node. According to some embodiments, also a computer program may be provided for implementing functionalities of the gateway, e.g., in the form of a physical medium storing the program code to be stored in the memory 206 or by making the program code available for download.

Figure 12:
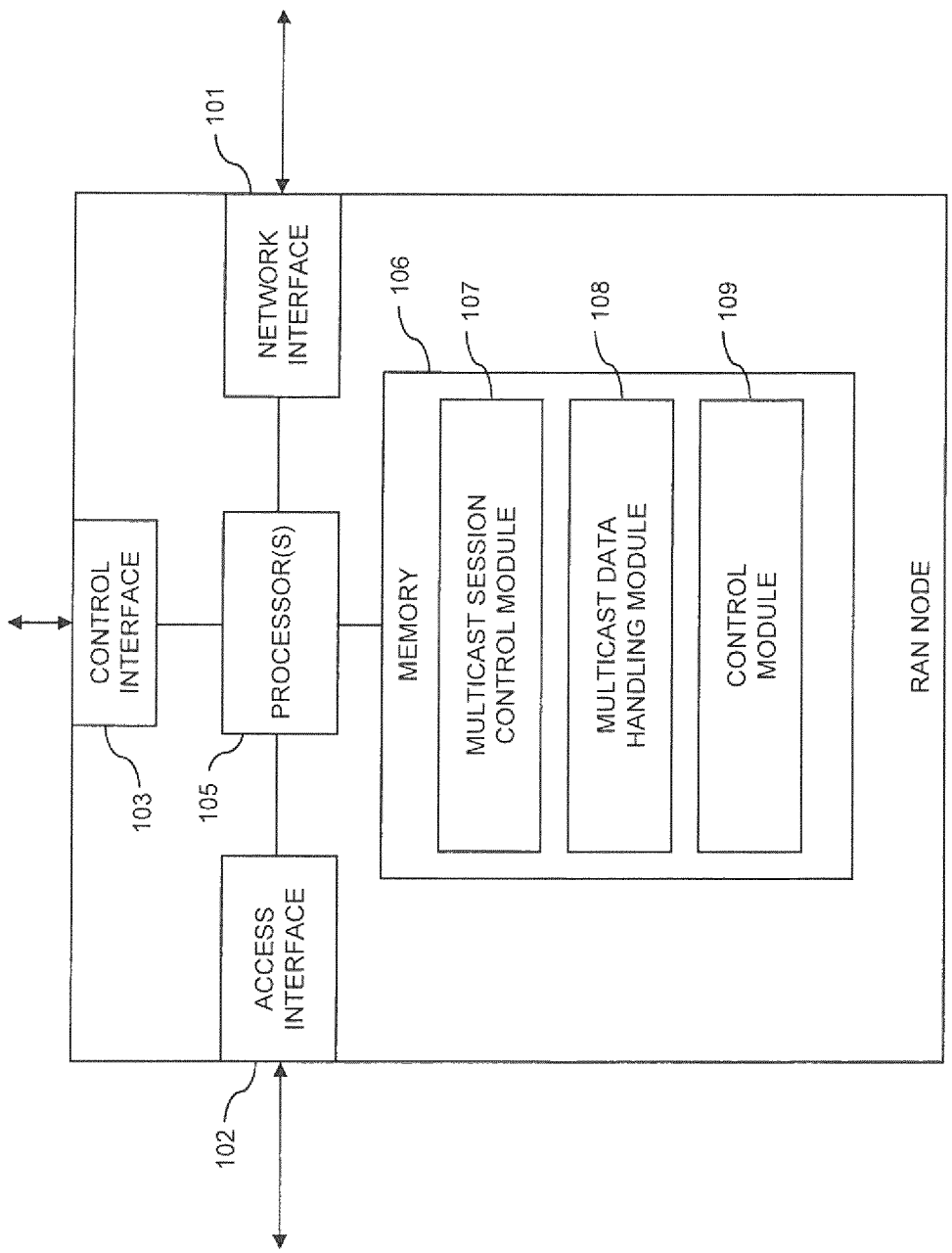
FIG. 12 schematically illustrates structures of a RAN node according to an embodiment of the invention.

FIG. 12 illustrates exemplary structures which may be used to implement the above concepts in a RAN node for a cellular network. For example, the RAN node may correspond to the above-mentioned eNB 100. However, other types of RAN nodes could be implemented as well, e.g., an RNC as used in the UMTS radio access technology or a BSC of the GSM/GPRS radio access technology.

In the illustrated example, the RAN node includes a network interface 101 which may be used for transport of multicast data from a gateway of the cellular network, e.g., from the MBMS-GW 200. The network interface 101 may for example be implemented by the above-mentioned M1 interface. As further illustrated, the RAN node may also include an access interface 102 which may be used for sending multicast data to a multicast radio channel. The access interface 102 may for example be implemented by the above-mentioned LTE-Uu radio interface. In some implementations, the access interface 102 may also be used for connection to remote radio units. As further illustrated, the RAN node may also include a control interface 103 which may be used for sending and receiving control plane signaling. The control interface 103 may for example be implemented by the above-mentioned S1-MME interface.

Further, the RAN node includes one or more processor(s) 105 coupled to the interfaces 101, 102, 103 and a memory 106 coupled to the processor(s) 105. The memory 106 may include a ROM, e.g., a flash ROM, a RAM, e.g., a DRAM or SRAM, a mass storage, e.g., a hard disk or solid state disk, or the like. The memory 106 includes suitably configured program code to be executed by the processor(s) 105 so as to implement the above-described functionalities of the RAN node. More specifically, the program code in the memory 106 may include a multicast session control module 107 so as to implement the above-described functionalities for controlling multicast sessions, e.g., by sending indications to other nodes, or by receiving indications from other nodes. Further, the program code in the memory 106 may also include a multicast data handling module 108 so as to implement the above-described functionalities of forwarding multicast data to multicast radio channels. Further, the program code in the memory 106 may also include a control module 109 so as to implement generic control functionalities of the RAN node, e.g., for handling different protocols as used for transmission of control plane data or user plane data.

It is to be understood that the structure as illustrated in FIG. 12 is merely schematic and that the RAN node may actually include further components which, for the sake of clarity, have not been illustrated, e.g., further interfaces or further processors. Further, it is to be understood that functionalities of two or more of the illustrated interfaces 101, 102, 103 may be combined in a single interface. Also, it is to be understood that the memory 106 may include further types of program code modules, which have not been illustrated, e.g., program code modules for implementing known functionalities of an eNB or similar node. According to some embodiments, also a computer program may be provided for implementing functionalities of the RAN node, e.g., in the form of a physical medium storing the program code to be stored in the memory 106 or by making the program code available for download.

As can be seen, the concepts as described above may be used to reduce the number of simultaneously used IP Multicast groups in a cellular network. This is accomplished by enabling reuse of the same IP Multicast group for transport the data of multiple multicast sessions. Accordingly, for transport of MBMS user data to a RAN node the IP multicast address of another active MBMS bearer service with an identical or similar MSA may be reused for a new MBMS bearer service. A RAN node may support multiple GTP-U tunnels, with different C-TEIDs, on the same IP Multicast address.

It is to be understood that the examples and embodiments as explained above are merely illustrative and susceptible to various modifications. For example, the concepts could be used in connection with various types of cellular networks and supported radio access technologies. In such modified implementations, the above-mentioned types of nodes, e.g., MBMS-GW and eNB may be replaced by other node types. For example, an RNC of the UMTS radio access technology or BSC of the GSM radio access technology could implement similar functionalities as the eNB of the illustrated examples. Further, a Gateway GPRS Support node could implement similar functionalities as the MBMS-GW of the illustrated examples. It is to be understood, that in such modified implementations the interfaces between the involved nodes may be different.

Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or system of cooperating devices.

The invention claimed is:

1. A method for controlling transmission of multicast data in a cellular network, the method comprising:
   a gateway allocating a set of multicast sessions to a single Internet Protocol Multicast group;
   for each of the multicast sessions, the gateway indicating an Internet Protocol Multicast address of the Internet Protocol Multicast group to at least one radio access network node of the cellular network;
   for each of the multicast sessions, the gateway indicating a different identifier to the at least one radio access network node; and
   the gateway sending multicast data of the multicast sessions in one or more Internet Protocol Multicast data packets addressed to the Internet Protocol Multicast address of the Internet Protocol Multicast group, the multicast data of each of the multicast sessions comprising the respective identifier to identify the multicast session.

2. The method according to claim 1, wherein the multicast sessions of the set have overlapping multicast service areas.

3. The method according to claim 2, wherein the gateway determines the set of multicast sessions by assigning a further multicast session to the set if the multicast service area of the further multicast session at least partially overlaps with the multicast service area of one ore more multicast sessions already assigned to the set.

4. The method according to claim 3, wherein the gateway determines the set of multicast sessions by assigning a further multicast session to the set if the multicast service area of the further multicast session is completely covered by the multicast service area of one ore more multicast sessions already assigned to the set.

5. The method according to claim 2, wherein the gateway determines the set of multicast sessions by assigning a further multicast session to the set if the multicast service area of the further multicast session includes a predefined area configured in the gateway.

6. The method according to claim 1, wherein multicast service areas of the multicast sessions of the set are included in a predefined area configured in the gateway.

7. The method according to claim 1, comprising:
   the gateway receiving the multicast data from a further node;
   wherein the gateway determines the set of multicast sessions on the basis of control information received from the further node.

8. The method according to claim 1, comprising:
   wherein the gateway determines the set of multicast sessions depending on an identity of a control node of the at least one radio access network node.

9. The method according to claim 8, wherein all radio access nodes involved in transmission of the multicast sessions are controlled by a control node from a predefined list of control nodes.

10. The method according to claim 1, comprising: the gateway sending multicast data of at least two of the multicast sessions in the same Internet Protocol Multicast data packet.

11. A method for controlling transmission of multicast data in a cellular network, the method comprising:
   a radio access network node of the cellular network receiving, from a gateway, an indication of an Internet Protocol Multicast address of an Internet Protocol Multicast group to which a multicast session and at least one further multicast session are allocated;
   the radio access network node receiving an identifier of said multicast session from the gateway;
   the radio access network node receiving multicast data of said multicast session and of said at least one further multicast session in one or more Internet Protocol Multicast data packets addressed to the Internet Protocol Multicast address of the Internet Protocol Multicast group, the multicast data of said multicast session comprising the indicated identifier;

on the basis of the identifier, the radio access network node distinguishing the multicast data of said multicast session from the multicast data of said at least one further multicast session; and the radio access network node forwarding the multicast data of said multicast session to a corresponding multicast radio channel.

12. The method according to claim 11, wherein said multicast session and the at least one further multicast session have overlapping multicast service areas.

13. The method according to claim 11, wherein the radio access network node and all other radio access network nodes transmitting said multicast session and said at least one further multicast session are controlled by a control node from a predefined list of control nodes.

14. The method according to claim 11, wherein said multicast session and said at least one further multicast session have multicast service areas which are included in a predefined area.

15. The method according to claim 11, comprising: the radio access network node filtering the received multicast data on the basis of the identifier received from the gateway.

16. A gateway for a cellular network, the gateway comprising:
at least one interface; and
at least one processor, wherein the at least one processor is configured to:
allocate a set of multicast sessions to a single Internet Protocol Multicast group;
via the at least one interface, indicate an Internet Protocol Multicast address of the Internet Protocol Multicast group to at least one radio access network node of the cellular network;
via the at least one interface, indicate a different identifier for each of the multicast sessions to the at least one radio access network node; and
via the at least one interface, send multicast data of the multicast sessions in one or more Internet Protocol Multicast data packets addressed to the Internet Protocol Multicast address of the Internet Protocol Multicast group, the multicast data of each of the multicast sessions comprising the respective identifier to identify the multicast session.

17. The gateway according to claim 16, wherein the multicast sessions of the set have overlapping multicast service areas.

18. The gateway according to claim 17, wherein the at least one processor is configured to determine the set of multicast sessions by assigning a further multicast session to the set if the multicast service area of the further multicast session at least partially overlaps with the multicast service area of one ore more multicast sessions already assigned to the set.

19. The gateway according to claim 18, wherein the at least on processor is configured to determine the set of multicast sessions by assigning a further multicast session to the set if the multicast service area of the further multicast session is completely covered by the multicast service area of one ore more multicast sessions already assigned to the set.

20. The gateway according to claim 17, wherein the at least one processor is configured to determine the set of multicast sessions by assigning a further multicast session to the set if the multicast service area of the further multicast session includes a predefined area configured in the gateway.

21. The gateway according to claim 16, wherein multicast service areas of the multicast sessions of the set are included in a predefined area configured in the gateway.

22. The gateway according to claim 16, wherein the at least one processor is configured to:
via the at least one interface, receive the multicast data from a further node of the cellular network; and
determine the set of multicast sessions on the basis of control information received from the further node.

23. The gateway according to claim 16, wherein the at least one processor is configured to determine the set of multicast sessions depending on an identity of a control node of the at least one radio access network node.

24. The gateway according to claim 23, wherein all radio access nodes involved in transmission of the multicast sessions are controlled by a control node from a predefined list of control nodes.

25. The gateway according to claim 16, wherein the at least one processor is configured to send multicast data of at least two of the multicast sessions in the same Internet Protocol Multicast data packet.

26. A radio access network node for a cellular network, the radio access network node comprising:
at least one interface; and
at least one processor, wherein the at least one processor is configured to:
via the at least one interface, receive an indication of an Internet Protocol Multicast address of an Internet Protocol Multicast group to which a multicast session and at least one further multicast session are allocated;
via the at least one interface, receive an identifier of said multicast session;
via the at least one interface, receive multicast data of said multicast session and of said at least one further multicast session in one or more Internet Protocol Multicast data packets addressed to the Internet Protocol Multicast address of the Internet Protocol Multicast group, the multicast data of said multicast session comprising the indicated identifier;
on the basis of the identifier, distinguish the multicast data of said multicast session from the multicast data of said at least one further multicast session; and
via the at least one interface, forward the multicast data of said multicast session to a corresponding multicast radio channel.

27. The radio access network node according to claim 26, wherein said multicast session and the at least one further multicast session have overlapping multicast service areas.

28. The radio access network node according to claim 26, wherein the radio access network node and all other radio access network nodes involved in transmission of said multicast session and said at least one further multicast session are controlled by a control node from a predefined list of control nodes.

29. The radio access network node according to claim 26, wherein the said multicast session and the at least one further multicast session have multicast service areas which are included in a predefined area.

30. The radio access network node according to claim 26, wherein the at least one processor is configured to filter the received multicast data on the basis of the identifier received from the gateway.

31. A computer program product comprising a non-transitory computer readable medium storing a computer program comprising program code for configuring a gateway to perform the method of claim 1.

32. A computer program product comprising a non-transitory computer readable medium storing a computer program comprising program code for configuring a radio access network node of a cellular network to perform the method of claim 11.

* * * * *

UNITED STATES PATENT AND TRADEMARK OFFICE
CERTIFICATE OF CORRECTION

PATENT NO.         : 9,456,315 B2
APPLICATION NO.    : 14/408163
DATED              : September 27, 2016
INVENTOR(S)        : Lohmar et al.

It is certified that error appears in the above-identified patent and that said Letters Patent is hereby corrected as shown below:

On the Title Page

In Item (54), in Title, in Column 1, Line 2, delete "MULTICASE" and insert -- MULTICAST --, therefor.

On Page 2, in Item (56), under "OTHER PUBLICATIONS", in Column 2, Line 2, delete "Broadcast/Multicast" and insert -- Broadcast Multicast --, therefor.

In the Specification

In Column 1, in Title, Line 2, delete "MULTICASE" and insert -- MULTICAST --, therefor.

In Column 1, Line 28, delete "Broadcast/Multicast" and insert -- Broadcast Multicast --, therefor.

In Column 4, Line 66, delete "140" and insert -- 140. --, therefor.

In Column 6, Line 50, delete "Web-based" and insert -- Web --, therefor.

In Column 8, Line 10, delete "related" and insert -- relate --, therefor.

In Column 8, Line 12, delete "112." and insert -- 112 --, therefor.

In Column 8, Line 16, delete "may" and insert -- may be --, therefor.

In Column 10, Line 37, delete "course" and insert -- coarse --, therefor.

In Column 12, Line 1, delete "defined" and insert -- define --, therefor.

In Column 12, Line 24, delete ""Y":" and insert -- "Y". --, therefor.

Signed and Sealed this
Eighteenth Day of April, 2017

Michelle K. Lee
*Director of the United States Patent and Trademark Office*

CERTIFICATE OF CORRECTION (continued)
U.S. Pat. No. 9,456,315 B2

In Column 13, Line 42, delete ""Y":" and insert -- "Y". --, therefor.

In Column 14, Line 56, delete "ore" and insert -- or --, therefor.

In Column 14, Line 67, delete "ore" and insert -- or --, therefor.

In the Claims

In Column 20, Line 18, in Claim 3, delete "ore" and insert -- or --, therefor.

In Column 20, Line 24, in Claim 4, delete "ore" and insert -- or --, therefor.

In Column 21, Line 54, in Claim 18, delete "ore" and insert -- or --, therefor.

In Column 21, Line 57, in Claim 19, delete "on" and insert -- one --, therefor.

In Column 21, Line 61, in Claim 19, delete "ore" and insert -- or --, therefor.